US012427772B2

(12) United States Patent
Yamamoto

(10) Patent No.: US 12,427,772 B2
(45) Date of Patent: Sep. 30, 2025

(54) LIQUID EJECTING HEAD

(71) Applicant: SEIKO EPSON CORPORATION, Tokyo (JP)

(72) Inventor: Shinichi Yamamoto, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 162 days.

(21) Appl. No.: 18/458,636

(22) Filed: Aug. 30, 2023

(65) Prior Publication Data

US 2024/0075742 A1 Mar. 7, 2024

(30) Foreign Application Priority Data

Sep. 5, 2022 (JP) ................................ 2022-140567

(51) Int. Cl.

*B41J 2/155* (2006.01)
*B41J 2/14* (2006.01)
*B41J 2/21* (2006.01)
*B41J 11/00* (2006.01)

(52) U.S. Cl.

CPC ........... *B41J 2/155* (2013.01); *B41J 2/14201* (2013.01); *B41J 2/2114* (2013.01); *B41J 11/0015* (2013.01)

(58) Field of Classification Search

CPC .... B41J 2/155; B41J 2/14201; B41J 11/0015; B41J 2/15; B41J 2/165; B41J 2/2114; B41J 2202/20; B41J 2/14; B41J 2/145

See application file for complete search history.

(56) References Cited

U.S. PATENT DOCUMENTS

2019/0382606 A1 12/2019 Iraqi et al.

FOREIGN PATENT DOCUMENTS

| | | | | | |
|---|---|---|---|---|---|
| JP | H10-193579 | A | | 7/1998 | |
| JP | 2007-136819 | A | | 6/2007 | |
| JP | 2010-242229 | A | | 10/2010 | |
| JP | 2020-506264 | A | | 2/2020 | |
| WO | WO-2018105500 | A1 | * | 6/2018 | ................ B41J 2/01 |

OTHER PUBLICATIONS

Ozawa, Kinya et al., Printing Device and Head Unit (WO 2018105500 A1), Jun. 1, 20184, [Second Embodiment, see Figs. 8-9]. (Year: 2018).*

* cited by examiner

*Primary Examiner* — Lisa Solomon
(74) *Attorney, Agent, or Firm* — Harness, Dickey & Pierce, P.L.C.

(57) ABSTRACT

A liquid ejecting head is a liquid ejecting head that is configured to eject a first liquid and a reaction liquid containing an aggregating agent for aggregating the first liquid. The liquid ejecting head includes a plurality of head units. A plurality of head chips having one or more nozzle rows are mounted on each of the plurality of head units, the plurality of head units are arranged side by side along a first axis, and a head chip having a first type nozzle row that is configured to eject the first liquid and a head chip having a second type nozzle row that is configured to eject the reaction liquid are mounted on different head units among the plurality of head units.

7 Claims, 9 Drawing Sheets

FIG. 5 ta1

| HEAD UNIT | NOZZLE ROW | FIRST EXAMPLE | SECOND EXAMPLE | FIRST COMPARATIVE EXAMPLE |
|---|---|---|---|---|
| [1] | ROW a | CYAN | REACTION LIQUID | REACTION LIQUID |
| | ROW b | RED | REACTION LIQUID | ORANGE |
| [2] | ROW a | GREEN | CYAN | CYAN |
| | ROW b | YELLOW | RED | RED |
| [3] | ROW a | MAGENTA | GREEN | GREEN |
| | ROW b | BLACK | YELLOW | YELLOW |
| [4] | ROW a | REACTION LIQUID | MAGENTA | MAGENTA |
| | ROW b | REACTION LIQUID | BLACK | BLACK |
| [5] | ROW a | BLACK | BLACK | BLACK |
| | ROW b | MAGENTA | MAGENTA | MAGENTA |
| [6] | ROW a | YELLOW | YELLOW | YELLOW |
| | ROW b | GREEN | GREEN | GREEN |
| [7] | ROW a | RED | RED | RED |
| | ROW b | CYAN | CYAN | CYAN |
| [8] | ROW a | | REACTION LIQUID | ORANGE |
| | ROW b | | REACTION LIQUID | REACTION LIQUID |
| CLOGGING | | ○ | ○ | × |
| DRYING UNEVENNESS | | ○ | ○ | ○ |
| COLOR DEVELOPMENT PROPERTY | | ○ | ○ | ○ |

FIG. 8 ta2

| INTERVAL | 16mm | 25.5mm | 33mm |
|---|---|---|---|
| PRESENCE OR ABSENCE OF NOZZLE CLOGGING | × | ○ | ○ |

FIG. 10 ta3

| HEAD UNIT | HEAD CHIP | NOZZLE ROW | THIRD EXAMPLE | FOURTH EXAMPLE | SECOND COMPARATIVE EXAMPLE | THIRD COMPARATIVE EXAMPLE |
|---|---|---|---|---|---|---|
| A[1] | H1 | ROW a | OVERCOAT LIQUID | OVERCOAT LIQUID | REACTION LIQUID | REACTION LIQUID |
| | | ROW b | ORANGE | ORANGE | OVERCOAT LIQUID | REACTION LIQUID |
| | H2 | ROW a | CYAN | CYAN | CYAN | CYAN |
| | | ROW b | RED | RED | RED | RED |
| | H3 | ROW a | GREEN | GREEN | GREEN | GREEN |
| | | ROW b | YELLOW | YELLOW | YELLOW | YELLOW |
| | H4 | ROW a | MAGENTA | MAGENTA | MAGENTA | MAGENTA |
| | | ROW b | BLACK | BLACK | BLACK | BLACK |
| A[2] | H1 | ROWS a AND b | UNUSED | REACTION LIQUID | UNUSED | UNUSED |
| | H2 | ROWS a AND b | REACTION LIQUID | REACTION LIQUID | UNUSED | UNUSED |
| | H3 | ROWS a AND b | REACTION LIQUID | REACTION LIQUID | UNUSED | UNUSED |
| | H4 | ROWS a AND b | UNUSED | REACTION LIQUID | UNUSED | UNUSED |
| A[3] | H1 | ROW a | BLACK | BLACK | BLACK | BLACK |
| | | ROW b | MAGENTA | MAGENTA | MAGENTA | MAGENTA |
| | H2 | ROW a | YELLOW | YELLOW | YELLOW | YELLOW |
| | | ROW b | GREEN | GREEN | GREEN | GREEN |
| | H3 | ROW a | RED | RED | RED | RED |
| | | ROW b | CYAN | CYAN | CYAN | CYAN |
| | H4 | ROW a | ORANGE | ORANGE | OVERCOAT LIQUID | REACTION LIQUID |
| | | ROW b | OVERCOAT LIQUID | OVERCOAT LIQUID | REACTION LIQUID | REACTION LIQUID |
| CLOGGING | | | ○ | ○ | × | × |
| DRYING UNEVENNESS | | | ○ | ○ | ○ | ○ |
| COLOR DEVELOPMENT PROPERTY | | | ○ | ○ | ○ | ○ |

LIQUID EJECTING HEAD

The present application is based on, and claims priority from JP Application Serial Number 2022-140567, filed Sep. 5, 2022, the disclosure of which is hereby incorporated by reference herein in its entirety.

BACKGROUND

1. Technical Field

The present disclosure relates to a liquid ejecting head.

2. Related Art

In the related art, a liquid ejecting head having a nozzle row that ejects a liquid such as ink to a medium has been known. In order to improve the fixability of a liquid to a medium, for example, JP-A-10-193579 discloses a liquid ejecting head that ejects a liquid such as ink and a reaction liquid containing an aggregating agent for aggregating the liquid.

However, in the above-described related art, fine droplets are generated when the reaction liquid is ejected, the droplets adhere to a nozzle that ejects a liquid such as ink, the liquid in the vicinity of the nozzle is aggregated, and the nozzle may become clogged due to aggregates of the liquid.

SUMMARY

According to a preferred aspect of the present disclosure, there is provided a liquid ejecting head that ejects a first liquid and a reaction liquid containing an aggregating agent for aggregating the first liquid, the liquid ejecting head including a plurality of head units, in which a plurality of head chips having one or more nozzle rows are mounted on each of the plurality of head units, the plurality of head units are arranged side by side along a first axis, and a head chip having a first type nozzle row that ejects the first liquid and a head chip having a second type nozzle row that ejects the reaction liquid are mounted on different head units among the plurality of head units.

According to a preferred aspect of the present disclosure, there is provided a liquid ejecting head that ejects a first liquid and a reaction liquid containing an aggregating agent for aggregating the first liquid, the liquid ejecting head including a plurality of nozzle rows, in which the plurality of nozzle rows are arranged side by side along a first axis, the plurality of nozzle rows include a first type nozzle row that ejects the first liquid and a second type nozzle row that ejects the reaction liquid, and an interval along the first axis between the first type nozzle row and the second type nozzle row is 25.5 millimeters or more.

BRIEF DESCRIPTION OF THE DRAWINGS

FIG. 5 is a diagram showing an arrangement mode of head units and an arrangement mode of liquids in a first example, a second example, and a first comparative example.

FIG. 8 is a diagram illustrating a relationship between an interval between a nozzle row that ejects a reaction liquid and a nozzle row that ejects ink, and clogging of a nozzle.

FIG. 10 is a diagram showing an arrangement mode of liquids in a third example, a fourth example, a second comparative example, and a third comparative example.

DESCRIPTION OF EMBODIMENTS

Figure 2:
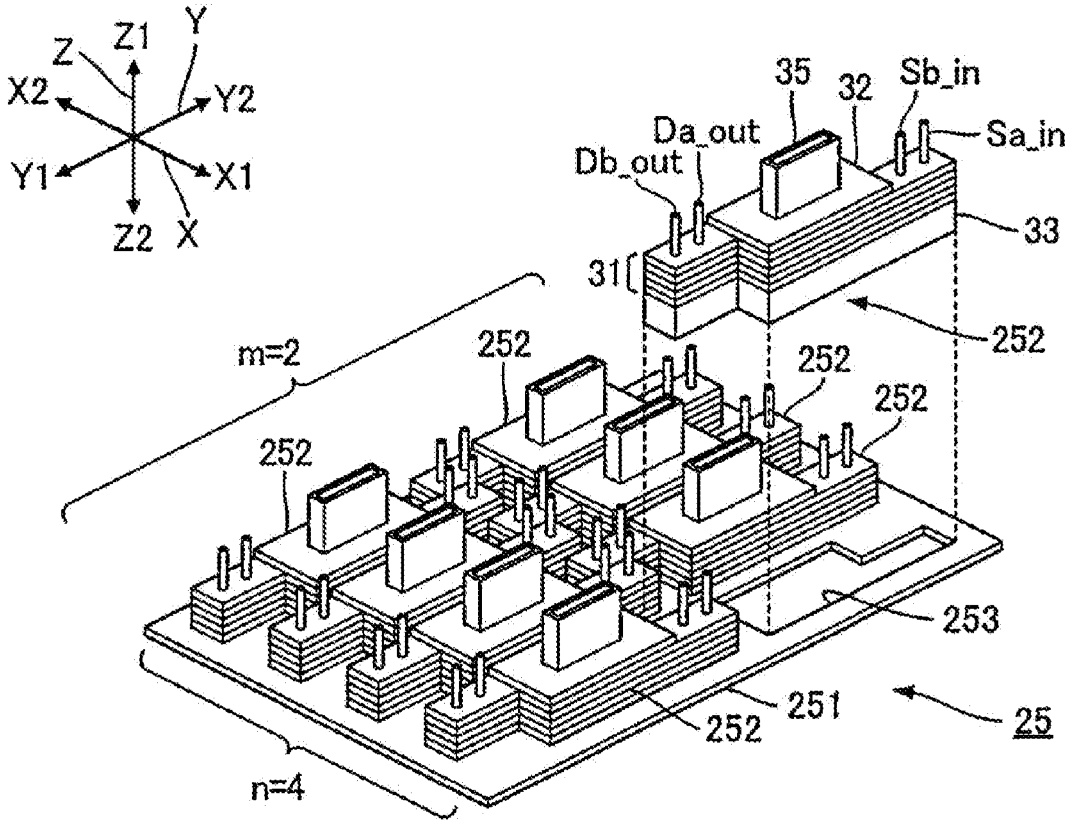
FIG. 2 is an exploded perspective view of a liquid ejecting head.

In the following description, an X-axis, a Y-axis, and a Z-axis which are orthogonal to each other are assumed. As illustrated in FIG. 2, one direction along the X-axis when viewed from an optional point is referred to as an X1 direction, and a direction opposite to the X1 direction is referred to as an X2 direction. Similarly, directions opposite to each other along the Y-axis from an optional point are referred to as a Y1 direction and a Y2 direction, and directions opposite to each other along the Z-axis from an optional point are referred to as a Z1 direction and a Z2 direction. An X-Y plane including the X-axis and the Y-axis corresponds to a horizontal plane. The Z-axis is an axis along a vertical direction, and the Z2 direction corresponds to a downward direction in the vertical direction.

1. First Embodiment

1-1. Overview of Liquid Ejecting Apparatus 100

Figure 1:
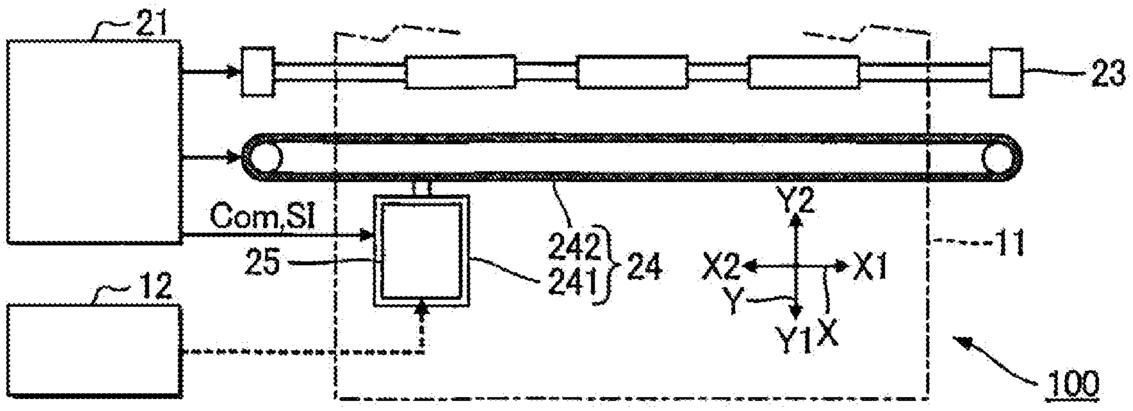
FIG. 1 is a configuration diagram illustrating a liquid ejecting apparatus according to a preferred embodiment.

FIG. 1 is a configuration diagram illustrating a liquid ejecting apparatus 100 according to a preferred embodiment. The liquid ejecting apparatus 100 of the present embodiment is an ink jet printing apparatus that ejects a reaction liquid containing ink, which is an example of a liquid, and an aggregating agent for aggregating the ink onto a medium 11. The medium 11 is typically a printing paper sheet. However, for example, a print target formed of any desired material such as a resin film or fabric is used as the medium 11. The ink of the present embodiment is a liquid having some coloring material such as dyes and pigments. After the reaction liquid is ejected onto the medium 11, by ejecting the ink at a position where the reaction liquid lands on the medium 11, the reaction liquid and the ink are mixed on the medium 11 or at a position where the ink penetrates into the medium 11 and the reaction liquid aggregates the ink, thereby improving the fixability of the ink on the medium 11. Note that the reaction liquid may be ejected to a position where the ink lands on the medium 11 within a predetermined period after the ink is ejected onto the medium 11. The predetermined period is, for example, a period of one pass, which will be described later.

As a specific combination of the reaction liquid and the ink, for example, there are two combinations shown below. The first combination is a reaction liquid having a basic polymer as an aggregating agent and an ink containing an anionic dye. The second combination is a reaction liquid containing an organic compound having two or more cationic groups per molecule as an aggregating agent, and an ink containing an anionic dye. Here, the combination of the reaction liquid and the ink is not limited to the above two combinations.

As illustrated in FIG. 1, the liquid ejecting apparatus 100 is provided with a liquid container 12 that stores ink and a reaction liquid. For example, a cartridge that is detachably attached to the liquid ejecting apparatus 100, a bag-shaped ink pack formed of a flexible film, or an ink tank that can be replenished with ink is used as the liquid container 12. In the first embodiment, the liquid container 12 includes a liquid container that stores the reaction liquid, further includes a liquid container that stores one or more inks among a liquid container that stores cyan ink, a liquid container that stores red ink, a liquid container that stores green ink, a liquid container that stores yellow ink, a liquid container that stores magenta ink, a liquid container that stores black ink, and a liquid container that stores orange ink. Any ink among the cyan ink, red ink, green ink, yellow ink, magenta ink, black ink, and orange ink corresponds to a "first liquid", and any ink other than the ink corresponding to the "first liquid" corresponds to a "second liquid".

As illustrated in FIG. 1, the liquid ejecting apparatus 100 includes a control unit 21, a transport mechanism 23, a moving mechanism 24, and a liquid ejecting head 25. The control unit 21 controls each element of the liquid ejecting apparatus 100. The control unit 21 includes, for example, a processing circuit such as a CPU and an FPGA and a storage circuit such as a semiconductor memory. A CPU is an abbreviation of a central processing unit. An FPGA is an abbreviation of a field programmable gate array.

The transport mechanism 23 transports the medium 11 along the Y-axis under the control of the control unit 21. The moving mechanism 24 causes the liquid ejecting head 25 to reciprocate along the X-axis under the control of the control unit 21. The moving mechanism 24 of the present embodiment includes a substantially box-shaped transport body 241 that accommodates the liquid ejecting head 25, and an endless belt 242 to which the transport body 241 is fixed. A configuration in which the liquid container 12 is mounted on the transport body 241 together with the liquid ejecting head 25 may also be employed.

As illustrated in FIG. 1, a drive signal Com for driving the liquid ejecting head 25 and a control signal SI for controlling the liquid ejecting head 25 are supplied from the control unit 21 to the liquid ejecting head 25. The liquid ejecting head 25 is driven by the drive signal Com under the control of the control signal SI, and ejects the reaction liquid and the ink from each of a plurality of nozzles N onto the medium 11. The liquid ejecting apparatus 100 executes a printing process in which the liquid ejecting head 25 ejects the reaction liquid and the ink onto the medium 11 in parallel with the transport of the medium 11 by the transport mechanism 23 and the repetitive reciprocation of the transport body 241, thereby forming an image on the surface of the medium 11. In the present embodiment, the X1 direction and the X2 direction are a main scanning directions, and the Y1 direction is a sub-scanning direction.

The printing process has two modes, bidirectional printing and unidirectional printing. In the following description, moving the liquid ejecting head 25 once in the main scanning direction is referred to as one pass. The period of one pass described above is a period required to move the liquid ejecting head 25 once in the main scanning direction. In bidirectional printing, the liquid ejecting apparatus 100 ejects the reaction liquid and the ink while moving the liquid ejecting head 25 in the X1 direction and executes an X1-direction printing process to form a partial image corresponding to the first pass on the medium 11. Next, the liquid ejecting apparatus 100 transports the medium for one pass, ejects the reaction liquid and the ink while moving the liquid ejecting head 25 in the X2 direction, and executes an X2-direction printing process to form a partial image corresponding to the second pass on the medium 11. Thereafter, the liquid ejecting apparatus 100 repeats the X1-direction printing process and the X2-direction printing process until an image is formed on the medium 11. In unidirectional printing, the liquid ejecting apparatus 100 executes the X1-direction printing process described above. Next, the liquid ejecting apparatus 100 executes a moving process of transporting the medium 11 for one pass and moving the liquid ejecting head 25 to an end portion in the X2 direction. Thereafter, the liquid ejecting apparatus 100 repeats the X1-direction printing process and the moving process until an image is formed on the medium 11. Bidirectional printing can shorten a period required for forming an image on the medium 11 as compared with unidirectional printing.

1-2. Liquid Ejecting Head 25

FIG. 2 is an exploded perspective view of the liquid ejecting head 25. As illustrated in FIG. 2, the liquid ejecting head 25 of the present embodiment includes a support body 251 and a plurality of head units 252. The support body 251 is a plate-shaped member that supports the plurality of head units 252. A plurality of attachment holes 253 are formed in the support body 251. Each head unit 252 is supported by the support body 251 in a state of being inserted into the attachment hole 253. In the present embodiment, the plurality of head units 252 are arranged in a matrix along the X-axis and the Y-axis. In the following description, the number of head units 252 arranged along the X-axis is referred to as a number of rows n, and the number of head units 252 arranged along the Y-axis is referred to as a number of lines m. Therefore, the number of head units 252 in the present embodiment is n×m. In the present embodiment, the number of rows n is an integer of 2 or more, and the number of lines m is an integer of 1 or more. The X-axis is an example of a "first axis". The X1 direction is an example of a "first direction", and the X2 direction is an example of a "direction opposite to the first direction". FIG. 2 illustrates an example in which the number of rows n is 4 and the number of lines m is 2. However, the number of rows, the number of lines, the number of head units 252, and the arrangement mode of the plurality of head units 252 are not limited to the above examples.

1-3. Head Unit 252

Figure 3:
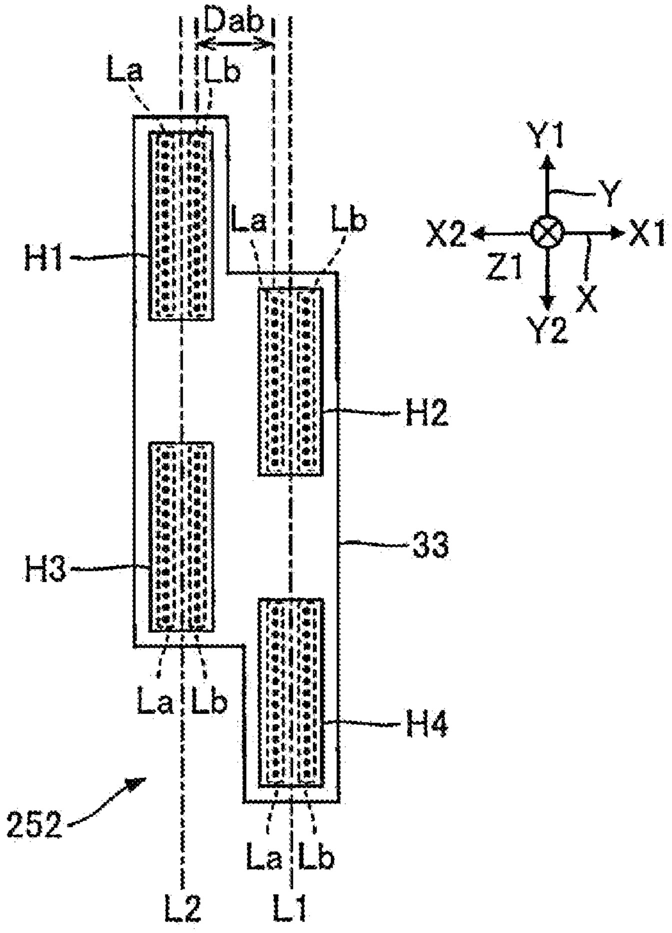
FIG. 3 is a plan view of a head unit when viewed in a Z1 direction.

FIG. 3 is a plan view of the head unit 252 when viewed in the Z1 direction. As illustrated in FIG. 3, the head unit 252 includes four head chips H1 to H4. A holding member 33 in FIG. 2 is a structure that accommodates and supports the four head chips H1 to H4. Hereinafter, the four head chips H1 to H4 may be collectively referred to as head chips Hn. Each head chip Hn ejects ink from a plurality of nozzles N. As illustrated in FIG. 3, the plurality of nozzles N provided the head unit 252 are divided into a first nozzle row La and a second nozzle row Lb. In the following description, the first nozzle row La and the second nozzle row Lb may be collectively referred to as "nozzle rows Ln". As illustrated in FIG. 3, in the first embodiment, one head unit 252 has four head chips Hn and one head chip Hn has two nozzle rows Ln, and thus one head unit 252 has eight nozzle rows Ln. In the head chips H1 to H4, a Y2 side end portion of the nozzle row Ln of the head chip H1 and a Y1 side end portion of the nozzle row Ln of the head chip H2 are aligned along the X-axis, a Y2 side end portion of the nozzle row Ln of the head chip H2 and a Y1 side end portion of the nozzle row Ln of the head chip H3 are aligned along the X-axis, a Y2 side end portion of the nozzle row Ln of the head chip H3 and a Y1 side end portion of the nozzle row Ln of the head chip H4 are aligned along the X-axis, and the head chips H1 to H4 are arranged to be displaced along the Y-axis. By ejecting droplets from the nozzle rows Ln of the head chips H1 to H4 all at once, a continuous straight line can be printed on the medium 11 along the Y-axis corresponding to a Y1 side end portion of the nozzle row Ln of the head chip H1 and a Y2 side end portion of the head chip H4. That is, each of the head chip H1 to the head chip H4 has a first nozzle row La belonging to the first nozzle row La of the head unit 252 and a second nozzle row Lb belonging to the second nozzle row Lb of the head unit 252. Here, one head chip Hn may have one nozzle row Ln. Further, the number of head chips Hn provided one head unit 252 is not limited to four.

Each of the first nozzle row La and the second nozzle row Lb is a set of the plurality of nozzles N arranged along the Y-axis. The first nozzle row La and the second nozzle row Lb are arranged side by side with an interval therebetween in the direction of the X-axis. In the following description, the suffix a is added to the reference numeral of the element related to the first nozzle row La, and the suffix b is added to the reference numeral of the element related to the second nozzle row Lb. For simplification of the description, the first nozzle row La may be referred to as "row a" and the second nozzle row Lb may be referred to as "row b".

As illustrated in FIG. 3, in one head unit 252, the head chip H1 and the head chip H3 are arranged on a straight line L2 parallel to the Y-axis, and the head chip H2 and the head chip H4 are arranged on a straight line L1 parallel to the Y-axis. The straight line L1 and the straight line L2 are parallel to each other. An interval Dab between the first nozzle row La of the head chip Hn arranged on the straight line L1 and the second nozzle row Lb of the head chip Hn arranged on the straight line L2 in the direction along the X-axis is, for example, 8 millimeters. The interval Dab is an interval along the X-axis between adjacent nozzle rows Ln among the eight nozzle rows Ln included in one head unit 252 among the plurality of head units 252. The interval Dab is an example of a "first interval".

1-4. Head Chip Hn

Figure 4:
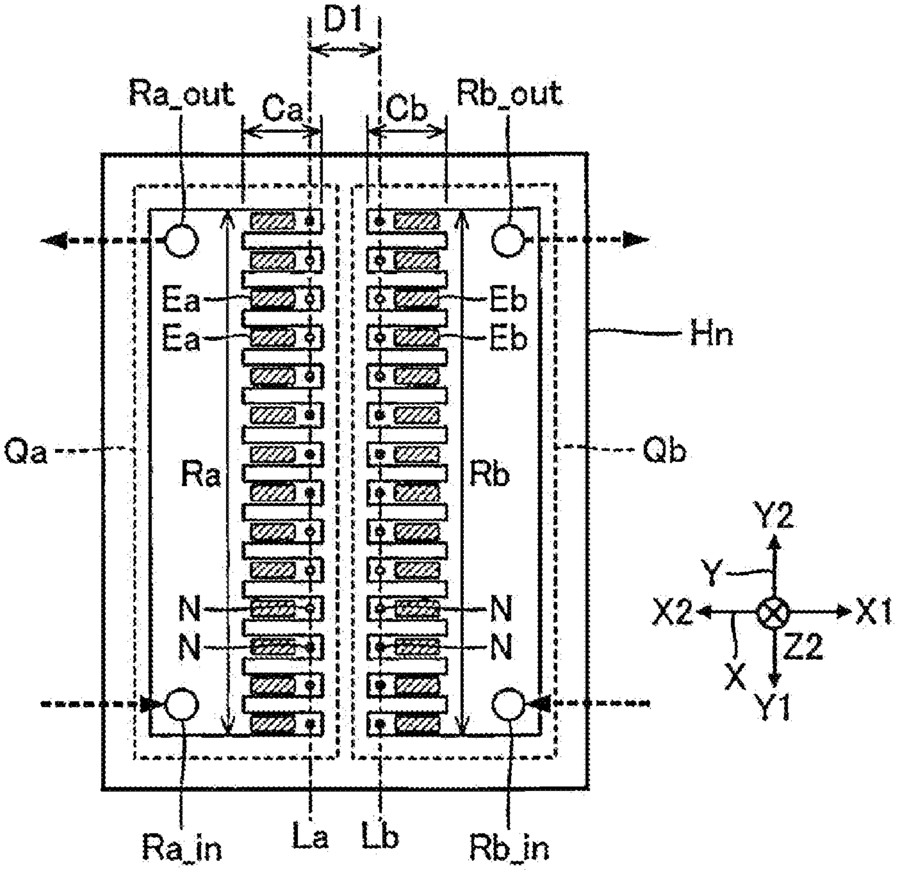
FIG. 4 is a plan view illustrating a configuration of each head chip.

FIG. 4 is a plan view illustrating a configuration of each head chip Hn. FIG. 4 schematically illustrates an internal structure of the head chip Hn when viewed in the Z2 direction. As illustrated in FIG. 4, each head chip Hn includes a first liquid ejecting portion Qa and a second liquid ejecting portion Qb. The first liquid ejecting portion Qa of each head chip Hn ejects any one of the reaction liquid and the plurality of types of ink supplied from the liquid container 12 from each nozzle N of the first nozzle row La. The second liquid ejecting portion Qb of each head chip Hn ejects any one of the reaction liquid and the plurality of types of ink supplied from the liquid container 12 from each nozzle N of the second nozzle row Lb. The type of the liquid ejected from each nozzle N of the first nozzle row La and the type of the liquid ejected from each nozzle N of the second nozzle row Lb may be the same or different. The type of liquid supplied to the head chip Hn will be described later with reference to FIG. 5.

An interval D1 along the X-axis between the first nozzle row La and the second nozzle row Lb in one head chip Hn is, for example, 1 millimeter. The interval D1 is an interval along the X-axis between adjacent nozzle rows Ln among the eight nozzle rows Ln included in one head unit 252 among the plurality of head units 252. The interval D1 is another example of the "first interval".

The first liquid ejecting portion Qa includes a first liquid storage chamber Ra, a plurality of pressure chambers Ca, and a plurality of drive elements Ea. The first liquid storage chamber Ra is a common liquid chamber continuous over the plurality of nozzles N of the first nozzle row La. The pressure chamber Ca and the drive element Ea are formed for each nozzle N of the first nozzle row La. The pressure chamber Ca is a space communicating with the nozzle N. Each of the plurality of pressure chambers Ca is filled with the liquid supplied from the first liquid storage chamber Ra. The drive element Ea fluctuates the pressure of the liquid in the pressure chamber Ca by being supplied with the drive signal Com. For example, a piezoelectric element that changes the volume of the pressure chamber Ca by deforming the wall surface of the pressure chamber Ca or a heating element that generates air bubbles in the pressure chamber Ca by heating the liquid in the pressure chamber Ca is desirably utilized as the drive element Ea. The drive element Ea fluctuates the pressure of the liquid in the pressure chamber Ca, and therefore the liquid in the pressure chamber Ca is ejected from the nozzle N.

Similarly to the first liquid ejecting portion Qa, the second liquid ejecting portion Qb includes a second liquid storage chamber Rb, a plurality of pressure chambers Cb, and a plurality of drive elements Eb. The second liquid storage chamber Rb is a common liquid chamber continuous over the plurality of nozzles N of the second nozzle row Lb. The pressure chamber Cb and the drive element Eb are formed for each nozzle N of the second nozzle row Lb. Each of the plurality of pressure chambers Cb is filled with the liquid supplied from the second liquid storage chamber Rb. The drive element Eb is, for example, the above-described piezoelectric element or heating element. The drive element Eb fluctuates the pressure of the liquid in the pressure chamber Cb, and therefore the liquid in the pressure chamber Cb is ejected from the nozzle N.

As illustrated in FIG. 4, each head chip Hn is provided with a supply port Ra in, a discharge port Ra out, a supply port Rb in, and a discharge port Rb out. The supply port Ra in and the discharge port Ra out communicate with the first liquid storage chamber Ra. The supply port Rb in and the discharge port Rb out communicate with the second liquid storage chamber Rb. Out of the liquids supplied to the first liquid storage chamber Ra, the liquids that are not ejected from each nozzle N of the first nozzle row La are discharged from the discharge port Ra out. Out of the liquids supplied to the second liquid storage chamber Rb, the liquids that are not ejected from each nozzle N of the second nozzle row Lb are discharged from the discharge port Rb out.

The description will now return to FIG. 2. A flow path structure 31 is a structure in which a flow path for supplying the ink stored in the liquid container 12 to the four head chips H1 to H4 is formed inside. The flow path structure 31 includes a first supply port Sa_in, a first discharge port Da out, a second supply port Sb_in, and a second discharge port db out. The liquid supplied to the first liquid ejecting portion Qa is supplied to the first supply port Sa_in. The liquid supplied to the second liquid ejecting portion Qb is supplied to the second supply port Sb_in. The liquid discharged from the first liquid storage chamber Ra of the four head chips Hn to the discharge port Ra out is discharged from the first discharge port Da out to the outside of the flow path structure 31. The liquid discharged from the second liquid storage chamber Rb of the four head chips Hn to the discharge port Rb out is discharged from the second discharge port db out to the outside of the flow path structure 31.

A wiring substrate 32 is a mounting component for electrically coupling each head unit 252 to the control unit 21. A connector 35 is installed on the surface of the wiring substrate 32 facing the Z1 direction. The connector 35 is a coupling component for electrically coupling the head unit 252 and the control unit 21 to each other.

1-5. Examples

Examples of the first embodiment will be described below, but the present disclosure is not limited to the following examples. Examples in which the numbers of rows n are different from each other will be described together with a first comparative example.

FIG. 5 is a diagram showing an arrangement mode of the head units 252 and an arrangement mode of the liquids in a first example, a second example, and a first comparative example. Even in a configuration in which a plurality of rows of n head units 252 are arranged in the X-axis direction in a plurality of lines in the Y-axis direction, the arrangement mode of the n head units 252 in each line is the same. Therefore, a configuration in which the number of lines m is one will be described below. In the first example, the liquid ejecting head 25 has seven head units 252, and in the second example, the liquid ejecting head 25 has eight head units 252. The seven head units 252 in the first example and the eight head units 252 in the second example are examples of a "plurality of head units".

Table ta1 illustrated in FIG. 5 shows an arrangement mode of the head units 252 and an arrangement mode of the liquids for each of the first example, the second example, and the first comparative example. In the first example, the second example, and the first comparative example, the first nozzle row La of each of the four head chips Hn included in one head unit 252 ejects the same type of liquid, and the second nozzle row Lb of each of the four head chips Hn included in one head unit 252 also ejects the same type of liquid. That is, since the combinations of the two types of liquids ejected by each of the four head chips Hn of one head unit 252 are all the same, the description for each head chip Hn is omitted in Table ta1. In the following description, among the plurality of head units 252 arranged along the X-axis, the head unit 252 arranged closest to the X1 direction is referred to as a head unit 252[1], and the head unit 252 located at an i-th position from the head unit 252[1] is referred to as a head unit 252[*i*]. i is an integer. Further, in order to avoid complication of illustration, in Table ta1, the head unit 252[*i*] is described by the numerical value indicated by i. In addition, all the first nozzle rows La of the four head chips Hn in the head unit 252[*i*] are collectively referred to as a first nozzle row La group [*i*], and all the second nozzle rows Lb of the four head chips Hn in the head unit 252[*i*] are collectively referred to as a second nozzle row Lb group [*i*].

1-5-1. First Example

Figure 6:
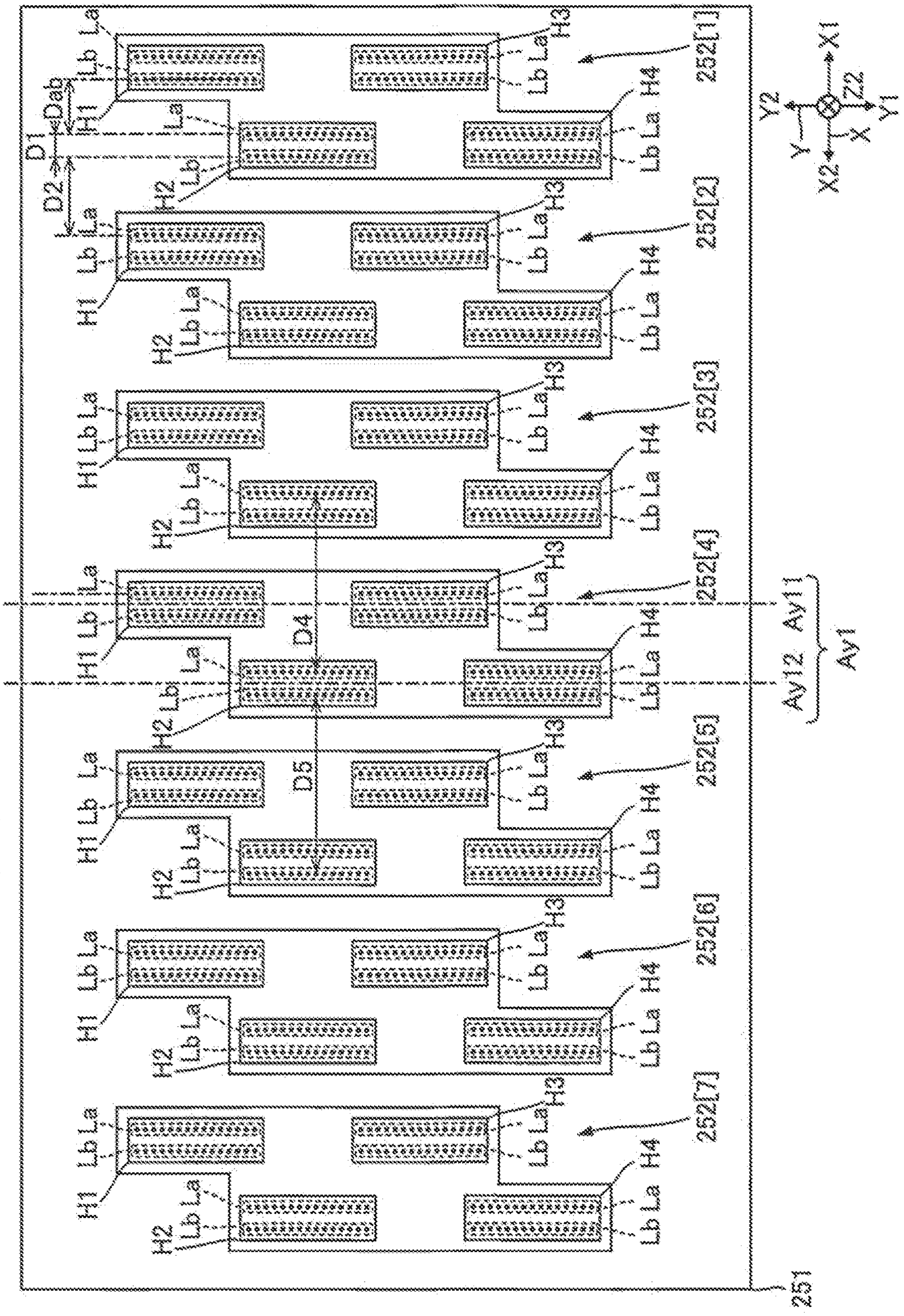
FIG. 6 is a plan view of a liquid ejecting head according to the first example when viewed in a Z2 direction.

FIG. 6 is a plan view of the liquid ejecting head 25 according to the first example when viewed in the Z2 direction. Here, when the liquid ejecting head 25 is viewed in the Z2 direction, the head chip Hn and the nozzle row Ln cannot be seen. However, in FIG. 6 and FIG. 7, which will be described later, in order to show the positional relationship of the nozzle rows Ln, the head chip Hn and the nozzle row Ln are shown.

In the first example, the head unit 252 having the nozzle rows Ln that eject the reaction liquid is arranged at the center of the plurality of head units 252. In other words, with respect to the head units 252 having the nozzle rows Ln that eject the reaction liquid, the number of head units 252 having the nozzle rows Ln that eject the ink arranged on the X1 side is the same as the number of head units 252 having the nozzle rows Ln that eject the ink arranged on the X2 side. Note that "nozzle row Ln that ejects the liquid" means a nozzle row Ln composed of a plurality of nozzles N that eject the liquid.

Further, in the first example, the nozzle row Ln that ejects the reaction liquid is arranged at the center of a plurality of nozzle rows Ln arranged in a row along the X-axis. Specifically, the head chips H1 of each of the seven head units 252 are arranged in a row along the X-axis. Since each head chip H1 has two nozzle rows Ln, 14 nozzle rows Ln are arranged in a row along the X-axis. Similarly, for the head chips H2 to H4, 14 nozzle rows Ln are arranged in a row along the X-axis. In the first example, in the plurality of nozzle rows Ln arranged in a row along the X-axis, the number of the nozzle rows Ln that eject ink arranged on the X1 side of the nozzle rows Ln that eject the reaction liquid is six and the number of the nozzle rows Ln that eject ink arranged on the X2 side thereof is six, which are the same.

As can be understood from FIG. 6 and Table ta1, in the first example, each of the plurality of nozzle rows Ln that eject any one of various inks and reaction liquids is arranged line-symmetrically with the nozzle rows Ln that eject the same type of liquid with respect to an axis of symmetry Ay11 or an axis of symmetry Ay12 parallel to the Y-axis. "Arranged line-symmetrically with respect to the axis of symmetry" means "arranged at substantially the same distance with respect to the axis of symmetry". "Substantially the same" includes not only the case of being completely the same but also the case of being considered to be the same in consideration of manufacturing errors. In the following description, the axis of symmetry Ay11 and the axis of symmetry Ay12 may be collectively referred to as an axis of symmetry Ay1. In the example illustrated in FIG. 6, the axis of symmetry Ay11 passes through a position at an equal distance from both the first nozzle row La and the second nozzle row Lb of the head chip H1 and the head chip H3 of the head unit 252[4] in plan view along the Z-axis. The axis of symmetry Ay12 passes through a position at an equal distance from both the first nozzle row La and the second nozzle row Lb of the head chip H2 and the head chip H4 of the head unit 252[4] in plan view along the Z-axis. Accordingly, the axis of symmetry Ay1 with respect to the head chip H1 and the head chip H3 is the axis of symmetry Ay11, and the axis of symmetry Ay1 with respect to the head chip H2 and the head chip H4 is the axis of symmetry Ay12.

For the sake of simplification of the description, for any i from 1 to 8, the first nozzle row La of each of the four head chips Hn of the head unit 252[*i*] may be referred to as "each first nozzle row La of the head unit 252[*i*]" and the second nozzle row Lb of each of the four head chips Hn of the head unit 252[*i*] may be referred to as "each second nozzle row Lb of the head unit 252[*i*]". Further, the first nozzle row La of the head chip Hn of the head unit 252[*i*] may be referred to as a first nozzle row La[*i*][Hn], and the second nozzle row Lb of the head chip Hn of the head unit 252[*i*] may be referred to as a second nozzle row Lb[*i*][Hn].

Each first nozzle row La of the head unit 252[4] and each second nozzle row Lb of the head unit 252[4] are arranged line-symmetrically with respect to the axis of symmetry Ay1. Specifically, the first nozzle row La[4][H1] and the first nozzle row La[4][H3], and the second nozzle row Lb[4][H1] and the second nozzle row Lb[4][H3] are arranged line-symmetrically with respect to the axis of symmetry Ay11. The first nozzle row La[4][H2] and the first nozzle row La[4][H4], and the second nozzle row Lb[4][H2] and the second nozzle row Lb[4][H4] are arranged line-symmetrically with respect to the axis of symmetry Ay12. Therefore, the head unit 252[4] through which the axis of symmetry Ay1 passes is arranged at the center of the plurality of head units 252, and with respect to the head unit 252[4], the number of head units 252 arranged on the X1 side is the same as the number of head units 252 arranged on the X2 side. Since the first nozzle row La of the head unit 252[4] ejects a reaction liquid, the second nozzle row Lb of the head unit 252[4] also ejects a reaction liquid.

Each first nozzle row La of the head unit 252[5] and each second nozzle row Lb of the head unit 252[3] are arranged line-symmetrically with respect to the axis of symmetry Ay1. Specifically, the first nozzle row La[5][H1] and the first nozzle row La[5][H3], and the second nozzle row Lb[3][H1] and the second nozzle row Lb[3][H3] are arranged line-symmetrically with respect to the axis of symmetry Ay11. The first nozzle row La[5][H2] and the first nozzle row La[5][H4], and the second nozzle row Lb[3][H2] and the second nozzle row Lb[3][H4] are arranged line-symmetrically with respect to the axis of symmetry Ay12. Therefore, the head unit 252[3] is arranged at the first position in the X1 direction with respect to the head unit 252[4], and the head unit 252[5] is arranged at the first position in the X2 direction with respect to the head unit 252[4]. Since the second nozzle row Lb of the head unit 252[3] ejects black ink, the first nozzle row La of the head unit 252[5] also ejects black ink.

Similarly, each second nozzle row Lb of the head unit 252[5] and each first nozzle row La of the head unit 252[3] are arranged line-symmetrically with respect to the axis of symmetry Ay1. Since each first nozzle row La of the head unit 252[3] ejects magenta ink, each second nozzle row Lb of the head unit 252[5] also ejects magenta ink.

Each first nozzle row La of the head unit 252[6] and each second nozzle row Lb of the head unit 252[2] are arranged line-symmetrically with respect to the axis of symmetry Ay1. Therefore, the head unit 252[2] is arranged at the second position in the X1 direction with respect to the head unit 252[4], and the head unit 252[6] is arranged at the second position in the X2 direction with respect to the head unit 252[4]. Since each second nozzle row Lb of the head unit 252[2] ejects yellow ink, each first nozzle row La of the head unit 252[6] also ejects yellow ink.

Similarly, each second nozzle row Lb of the head unit 252[6] and each first nozzle row La of the head unit 252[2] are arranged line-symmetrically with respect to the axis of symmetry Ay1. Since each first nozzle row La of the head unit 252[2] ejects green ink, each second nozzle row Lb of the head unit 252[6] also ejects green ink.

Each first nozzle row La of the head unit 252[7] and each second nozzle row Lb of the head unit 252[1] are arranged line-symmetrically with respect to the axis of symmetry Ay1. Therefore, the head unit 252[1] is arranged at the third position in the X1 direction with respect to the head unit 252[4], and the head unit 252[7] is arranged at the third position in the X2 direction with respect to the head unit 252[4]. Since each second nozzle row Lb of the head unit 252[1] ejects red ink, each first nozzle row La of the head unit 252[7] also ejects red ink.

Similarly, each second nozzle row Lb of the head unit 252[7] and each first nozzle row La of the head unit 252[1] are arranged line-symmetrically with respect to the axis of symmetry Ay1. Since each first nozzle row La of the head unit 252[1] ejects cyan ink, each second nozzle row Lb of the head unit 252[6] also ejects cyan ink.

With such a configuration, in the plurality of head units 252, nozzle rows Ln arranged in a row along the X-axis are arranged in the order of a nozzle row Ln that ejects a reaction liquid, a nozzle row Ln that ejects a reaction liquid, a nozzle row Ln that ejects black ink, a nozzle row Ln that ejects magenta ink, a nozzle row Ln that ejects yellow ink, a nozzle row Ln that ejects green ink, a nozzle row Ln that ejects red ink, and a nozzle row Ln that ejects cyan ink in both the order from the axis of symmetry Ay1 to the X1 side and the order from the axis of symmetry Ay1 to the X2 side in any of the head chip H1 to the head chip H4. By arranging the nozzle rows Ln included in the plurality of head units 252 in this way, regardless of whether the liquid ejecting head 25 performs the X1-direction printing process or the X2-direction printing process in bidirectional printing, the overlapping order of the types of liquids on the medium can be same, and the time difference between landings of different types of liquids can be made the same. Therefore, it is possible to suppress the difference in color depending on the scanning direction and the difference in the amount of aggregation of ink depending on the scanning direction.

As can be understood from FIG. 6 and Table ta1, in the first example, the head unit 252 including the head chip Hn having the nozzle row Ln that ejects the reaction liquid is only the head unit 252[4], and the head unit 252[4] does not have the nozzle row Ln that ejects ink. Further, the head units 252 including the head chip Hn having the nozzle row Ln that ejects ink are the head units 252[1] to [3] and [5] to [7], and the head units 252[1] to [3] and [5] to [7] do not have the nozzle rows Ln that eject the reaction liquid. Therefore, the head chip Hn having the nozzle row Ln that ejects ink and the head chip Hn having the nozzle row Ln that ejects the reaction liquid are mounted on different head units 252. Any one nozzle row Ln among the eight nozzle rows Ln provided in any head unit 252 other than the head unit 252[4] is an example of a "first type nozzle row". Any one nozzle row Ln among the eight nozzle rows Ln provided in the head unit 252[4] is an example of a "second type nozzle row".

As illustrated in FIG. 6, an interval D2 along the X-axis between the second nozzle row Lb[1][H2] and the first nozzle row La[2][H1] is 25.5 millimeters or more. Therefore, the interval D2 of the nozzle rows Ln between the adjacent head units 252 is wider than the interval Dab and the interval D1 of the nozzle rows Ln in the same head unit 252.

Note that the interval D2 is an interval along the X-axis between the nozzle row Ln closest to the other head unit 252 among the eight nozzle rows Ln included in one head unit 252 in the two adjacent head units 252 and the nozzle row Ln closest to the one head unit 252 among the eight nozzle rows Ln included in the other head unit 252, and is an example of a "second interval".

In the first example, the head unit 252[i1] is an example of a "first head unit" and the head unit 252[8-*i*1] is an example of a "second head unit" in any integer it from 1 to 3. The head unit 252[4] is an example of a "third head unit". When each first nozzle row La of the head unit 252[i1] is a "first type nozzle row", each second nozzle row Lb of the head unit 252[8-*i*1] also corresponds to the "first type nozzle row", the ink ejected from each first nozzle row La of the head unit 252[i1] and the ink ejected from each second nozzle row Lb of the head unit 252[8-*i*1] correspond to the "first liquid".

Further, when each second nozzle row Lb of the head unit 252[i1] is the "first type nozzle row", each first nozzle row La of the head unit 252[8-*i*1] also corresponds to the "first type nozzle row", the ink ejected from each second nozzle row Lb of the head unit 252[i1] and the ink ejected from each first nozzle row La of the head unit 252[8-*i*1] correspond to the "first liquid".

In addition, the head unit 252[i2] is an example of a "fourth head unit" and the head unit 252[8-*i*2] is an example of a "fifth head unit" in an integer i2 different from the integer it among 1 to 3. When each first nozzle row La of the head unit 252[i2] is a "third type nozzle row", each second nozzle row Lb of the head unit 252[8-*i*2] also corresponds to the "third type nozzle row", the ink ejected from each first nozzle row La of the head unit 252[i2] and the ink ejected from each second nozzle row Lb of the head unit 252[8-*i*2] correspond to the "second liquid".

Further, when each second nozzle row Lb of the head unit 252[i2] is the "third type nozzle row", each first nozzle row La of the head unit 252[8-*i*2] also corresponds to the "third type nozzle row", the ink ejected from each second nozzle row Lb of the head unit 252[i2] and the ink ejected from each first nozzle row La of the head unit 252[8-*i*2] correspond to the "second liquid".

By arranging the nozzle rows Ln that eject the same type of liquid symmetrically with respect to the axis of symmetry Ay1, compared to the mode in which the nozzle rows Ln that eject the same type of liquid are not arranged symmetrically with respect to the axis of symmetry Ay1, drying unevenness can be suppressed when bidirectional printing is executed. The drying unevenness is that the degree of drying of the ink and the degree of drying of the reaction liquid differ depending on dots. Specifically, for example, in bidirectional printing, drying unevenness is more likely to occur when a first difference from the time when the reaction liquid lands on the medium 11 to the time when the ink lands on the medium 11 in a case in which the X1-direction printing process is executed is separated from a second difference from the time when the reaction liquid lands on the medium 11 to the time when the ink lands on the medium 11 in a case in which the X2-direction printing process is executed. In the first example, the arrangement order of the types of liquids from the axis of symmetry Ay1 to the X1 side and the arrangement order of the types of liquids from the axis of symmetry Ay1 to the X2 side are the same, the distances along the X-axis from the two nozzle rows Ln that eject the ink of the same color arranged line-symmetrically with respect to the axis of symmetry Ay1 to the nozzle row Ln that ejects the reaction liquid are substantially the same, and by moving the liquid ejecting head 25 along the X-axis at a constant speed, the first difference and the second difference become substantially the same. Therefore, in the first example, it is possible to suppress the occurrence of drying unevenness in bidirectional printing.

"The distances along the X-axis from the two nozzle rows Ln that eject the ink of the same color arranged line-symmetrically with respect to the axis of symmetry Ay1 to the nozzle row Ln that ejects the reaction liquid are substantially the same" means that a first distance and a second distance to be described below are substantially the same. The first distance is a distance in the direction along the X-axis from one nozzle row Ln of two nozzle rows Ln ejecting ink of the same color arranged line-symmetrically with respect to the axis of symmetry Ay1 in the nozzle rows Ln arranged in a row along the X-axis to the nozzle row Ln that ejects the reaction liquid, which overlaps when viewed in the direction along the X-axis and is located closest to the one nozzle row Ln. The second distance is a distance in the direction along the X-axis from the other nozzle row Ln to the nozzle row Ln that ejects the reaction liquid, which overlaps when viewed in the direction along the X-axis and is located closest to the other nozzle row Ln.

For example, in the nozzle row Ln of the head chips H2 arranged in a row along the X-axis, the first nozzle row La[3][H2] and the second nozzle row Lb[5][H2] are arranged line-symmetrically with respect to the axis of symmetry Ay12. Then, the nozzle row Ln which overlaps with the first nozzle row La[3][H2] when viewed in the direction along the X-axis and is located closest to the first nozzle row La[3][H2], and ejects the reaction liquid is the first nozzle row La[4][H2]. Further, the nozzle row Ln which overlaps with the second nozzle row Lb[5][H2] when viewed in the direction along the X-axis and is located closest to the second nozzle row Lb[5][H2], and ejects the reaction liquid is the second nozzle row Lb[4][H2]. Therefore, a distance D4 in the direction along the X-axis from the first nozzle row La[3][H2] to the first nozzle row La[4][H2] and a distance D5 in the direction along the X-axis from the second nozzle row Lb[5][H2] to the second nozzle row Lb[4][H2] are substantially the same.

1-5-2. Second Example

Figure 7:
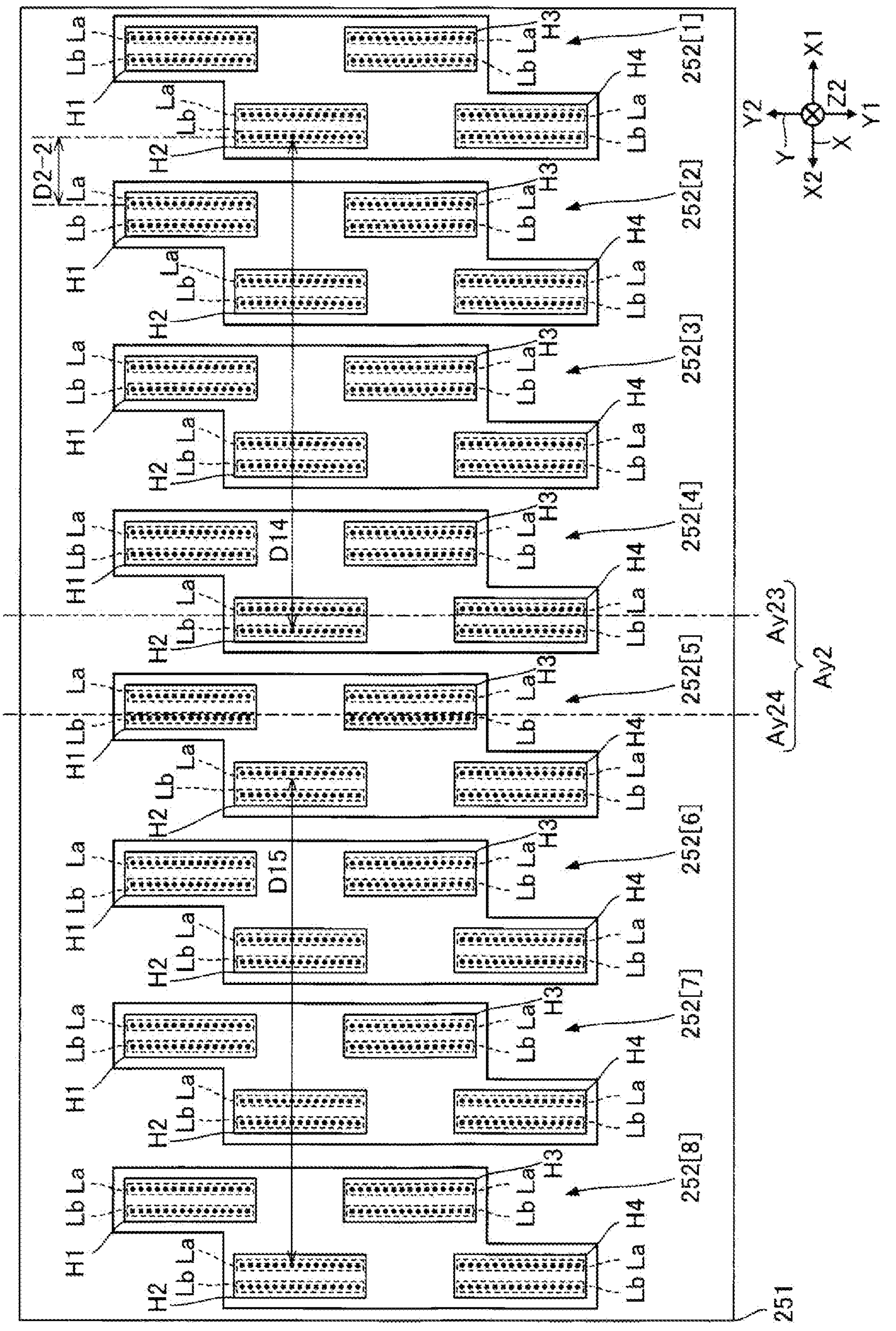
FIG. 7 is a plan view of a liquid ejecting head according to the second example when viewed in the Z2 direction.

FIG. 7 is a plan view of the liquid ejecting head 25 according to the second example when viewed in the Z2 direction. In the second example, the head units 252 having the nozzle rows Ln that eject the reaction liquid are arranged at both end portions of the plurality of head units 252. Further, with respect to the head units 252 having the nozzle rows Ln that eject the ink, the number of head units 252 having the nozzle rows Ln that eject the reaction liquid arranged on the X1 side end portion is the same as the number of head units 252 having the nozzle rows Ln that eject the reaction liquid arranged on the X2 side end portion.

Further, in the second example, the nozzle rows Ln that eject the reaction liquid are arranged at the both end portions of a plurality of nozzle rows Ln arranged in a row along the X-axis. Specifically, the head chips H1 of each of the eight head units 252 are arranged in a row along the X-axis. Since each head chip H1 has two nozzle rows Ln, 16 nozzle rows Ln are arranged in a row along the X-axis. Similarly, for the head chips H2 to H4, 16 nozzle rows Ln are arranged in a row along the X-axis. In the second example, in the plurality of nozzle rows Ln arranged in a row along the X-axis, the number of the nozzle rows Ln that eject the reaction liquid arranged on the X1 side of the nozzle rows Ln that eject the ink is two and the number of the nozzle rows Ln that eject the reaction liquid arranged on the X2 side thereof is two, which are the same.

As can be understood from FIG. 7 and Table ta1, in the second example, the plurality of nozzle rows Ln that eject any one of various inks and reaction liquids divide the eight head units 252 into two portions at the center, respectively, in the arrangement order of liquid types from the second nozzle row Lb group of the head unit 252[4] to the first nozzle row La group of the head unit 252[1] in the X1 direction and the head unit and the arrangement order of liquid types from the first nozzle row La group of the head unit 252[5] to the second nozzle row Lb group of the head unit 252[8] in the X2 direction and the head unit, they are arranged line-symmetrically with respect to an axis of symmetry Ay23 or an axis of symmetry Ay24 parallel to the Y-axis. In the following description, the axis of symmetry Ay23 and the axis of symmetry Ay24 may be collectively referred to as an axis of symmetry Ay2. In the example illustrated in FIG. 7, the axis of symmetry Ay23 passes through a position at an equal distance from both the second nozzle rows Lb of the head chip H1 and the head chip H3 of the head unit 252[4] and the first nozzle rows La of the head chip H1 and the head chip H3 of the head unit 252[5] in plan view along the Z-axis. The axis of symmetry Ay24 passes through a position at an equal distance from both the second nozzle rows Lb of the head chip H2 and the head chip H4 of the head unit 252[4] and the first nozzle rows La of the head chip H2 and the head chip H4 of the head unit 252[5] in plan view along the Z-axis. Accordingly, the axis of symmetry Ay2 with respect to the head chip H1 and the head chip H3 is the axis of symmetry Ay23, and the axis of symmetry Ay1 with respect to the head chip H2 and the head chip H4 is the axis of symmetry Ay24.

The first nozzle row La of the head unit 252[5] and the second nozzle row Lb of the head unit 252[4] are arranged line-symmetrically with respect to the axis of symmetry Ay2. Specifically, the first nozzle row La[5][H1] and the first nozzle row La[5][H3], and the second nozzle row Lb[4][H1] and the second nozzle row Lb[4][H3] are arranged line-symmetrically with respect to the axis of symmetry Ay23. The first nozzle row La[5][H2] and the first nozzle row La[5][H4], and the second nozzle row Lb[4][H2] and the second nozzle row Lb[4][H4] are arranged line-symmetrically with respect to the axis of symmetry Ay24. Since each second nozzle row Lb of the head unit 252[4] ejects black ink, each first nozzle row La of the head unit 252[5] also ejects black ink.

Similarly, the second nozzle row Lb of the head unit 252[5] and the first nozzle row La of the head unit 252[4] are arranged line-symmetrically with respect to the axis of symmetry Ay2. Since each nozzle N of the first nozzle row La of the head unit 252[4] ejects magenta ink, each nozzle N of the second nozzle row Lb of the head unit 252[5] also ejects magenta ink.

The first nozzle row La of the head unit 252[6] and the second nozzle row Lb of the head unit 252[3] are arranged line-symmetrically with respect to the axis of symmetry Ay2. Since each second nozzle row Lb of the head unit 252[3] ejects yellow ink, each first nozzle row La of the head unit 252[6] also ejects yellow ink.

The second nozzle row Lb of the head unit 252[6] and the first nozzle row La of the head unit 252[3] are arranged line-symmetrically with respect to the axis of symmetry Ay2. Since the first nozzle row La of the head unit 252[3] ejects green ink, each second nozzle row Lb of the head unit 252[6] also ejects green ink.

The first nozzle row La of the head unit 252[7] and the second nozzle row Lb of the head unit 252[2] are arranged line-symmetrically with respect to the axis of symmetry Ay2. Since each second nozzle row Lb of the head unit 252[2] ejects red ink, each first nozzle row La of the head unit 252[7] also ejects red ink.

The second nozzle row Lb of the head unit 252[7] and the first nozzle row La of the head unit 252[2] are arranged line-symmetrically with respect to the axis of symmetry Ay2. Since each first nozzle row La of the head unit 252[2] ejects cyan ink, each second nozzle row Lb of the head unit 252[7] also ejects cyan ink.

The first nozzle row La of the head unit 252[8] and the second nozzle row Lb of the head unit 252[1] are arranged line-symmetrically with respect to the axis of symmetry Ay2. Since each second nozzle row Lb of the head unit 252[1] ejects a reaction liquid, each first nozzle row La of the head unit 252[7] also ejects a reaction liquid.

The second nozzle row Lb of the head unit 252[8] and the first nozzle row La of the head unit 252[1] are arranged line-symmetrically with respect to the axis of symmetry Ay2. Since each first nozzle row La of the head unit 252[1] ejects a reaction liquid, each second nozzle row Lb of the head unit 252[8] also ejects a reaction liquid.

With such a configuration, in the plurality of head units 252, nozzle rows Ln arranged in a row along the X-axis are arranged in the order of a nozzle row Ln that ejects black ink, a nozzle row Ln that ejects magenta ink, a nozzle row Ln that ejects yellow ink, a nozzle row Ln that ejects green ink, a nozzle row Ln that ejects red ink, a nozzle row Ln that ejects cyan ink, a nozzle row Ln that ejects a reaction liquid, and a nozzle row Ln that ejects a reaction liquid in both the order from the axis of symmetry Ay2 to the X1 side and the order from the axis of symmetry Ay2 to the X2 side in any of the head chip H1 to the head chip H4.

Accordingly, it is possible to suppress printing unevenness due to bidirectional printing, similarly to the first example.

As can be understood from FIG. 7 and Table ta1, in the second example, the head units 252 including the head chip Hn having the nozzle row Ln that ejects the reaction liquid are only the head unit 252[1] and the head unit 252[8], and the head unit 252[1] and the head unit 252[8] do not have the nozzle rows Ln that eject ink. Further, the head units 252 including the head chip Hn having the nozzle row Ln that ejects ink are the head units 252[2] to [7], and the head units 252[2] to [7] do not have the nozzle rows Ln that eject the reaction liquid. Therefore, the head chip Hn having the nozzle row Ln that ejects ink and the head chip Hn having the nozzle row Ln that ejects the reaction liquid are mounted on different head units 252. In the second example, one nozzle row Ln among the eight nozzle rows Ln provided in any head unit 252 other than the head unit 252[1] and the head unit 252[8] is an example of a "first type nozzle row". Any one nozzle row Ln among the eight nozzle rows Ln provided in the head unit 252[1] and the head unit 252[8] is an example of a "second type nozzle row".

Also in the second example, an interval D2-2 along the X-axis between the second nozzle row Lb of the head chip H2 of the head unit 252[1] and the first nozzle row La of the head chip H1 of the head unit 252[2] is 25.5 millimeters or more. Therefore, the interval D2-2 is wider than the interval Dab and the interval D1.

Note that, similarly to the interval D2, the interval D2-2 is an interval along the X-axis between the nozzle row Ln closest to the other head unit 252 among the eight nozzle rows Ln included in one head unit 252 in the two adjacent head units 252 and the nozzle row Ln closest to the one head unit 252 among the eight nozzle rows Ln included in the other head unit 252.

In the second example, the head unit 252[i1] is an example of a "sixth head unit", the head unit 252[1] is an example of a "seventh head unit", and the head unit 252[8] is an example of an "eighth head unit" in any integer it from 2 to 7. As can be understood from FIG. 7, the head unit 252[1] is arranged in the X1 direction with respect to the head unit 252[i1]. In addition, the head unit 252[8] is arranged in the X2 direction with respect to the head unit 252[i1].

In the second example as well, similarly to the first example, by arranging the nozzle row Ln that ejects the same type of liquid with respect to the axis of symmetry Ay2, it is possible to suppress drying unevenness when bidirectional printing is executed.

For example, the second nozzle row Lb[4][H2] and the first nozzle row La[5][H2] are arranged line-symmetrically with respect to the axis of symmetry Ay24. Then, the nozzle row Ln which overlaps with the second nozzle row Lb[4][H2] when viewed in the direction along the X-axis and is located closest to the second nozzle row Lb[4][H2], and ejects the reaction liquid is the second nozzle row Lb[1][H2]. Further, the nozzle row Ln which overlaps with the first nozzle row La[5][H2] when viewed in the direction along the X-axis and is located closest to the first nozzle row La[5][H2], and ejects the reaction liquid is the first nozzle row La[8][H2]. Therefore, a distance D14 in the direction along the X-axis from the second nozzle row Lb[4][H2] to the second nozzle row Lb[1][H2] and a distance D15 in the direction along the X-axis from the first nozzle row La[5][H2] to the first nozzle row La[8][H2] are substantially the same.

1-5-3. First Comparative Example

The first comparative example is common to the second example in that the head units 252 having the nozzle rows Ln that eject the reaction liquid are arranged at both end portions of the plurality of head units 252, but is different from the second example in that the head unit 252 arranged at the end portion has a nozzle row Ln that ejects the reaction liquid and a nozzle row Ln that ejects the ink. As shown in Table ta1 of FIG. 5, each first nozzle row La of the head unit 252[1] and each second nozzle row Lb of the head unit 252[8] eject the reaction liquid. Each second nozzle row Lb of the head unit 252[1] and each first nozzle row La of the head unit 252[8] eject orange ink.

1-5-4. Effects of First Example and Second Example

The effects of the first example and the second example will be described with reference to Table ta1. The circle symbols described in the column of clogging shown in Table ta1 and Table ta3, which will be described later, mean that the nozzle N that ejects ink is not clogged. The cross symbols described in the column of clogging shown in Table ta1 and Table ta3 mean that the nozzle N that ejects ink is clogged. As shown in Table ta1, experiments conducted by the inventors have shown that clogging of the nozzle N that ejects ink does not occur in the first example and the second example, and clogging of the nozzle N that ejects ink occurs in the first comparative example. The cause of clogging of the nozzle N is considered to be that fine droplets, so-called mist, are generated when the reaction liquid is ejected, the mist of the reaction liquid adheres to the nozzle N that ejects ink, the ink in the vicinity of the nozzle N aggregates, and the nozzle N is clogged due to aggregates of ink.

By separating an interval between the nozzle row Ln having the nozzle N that ejects the reaction liquid and the nozzle row Ln having the nozzle N that ejects the ink to such an extent that the mist of the reaction liquid does not reach the nozzle N that ejects the ink, it is possible to suppress clogging of the nozzle N that ejects ink. A specific interval will be described with reference to FIG. 8.

FIG. 8 is a diagram illustrating a relationship between an interval between a nozzle row Ln that ejects a reaction liquid and a nozzle row Ln that ejects ink, and clogging of a nozzle N. "mm" described in Table ta2 in FIG. 8 means millimeters. As shown in Table ta2, experiments conducted by the inventors have shown that clogging of nozzle N that ejects ink occurs when the interval between the nozzle N that ejects the reaction liquid and the nozzle N that ejects the ink is 16 millimeters. On the other hand, experiments conducted by the inventors have shown that clogging of nozzle N that ejects ink does not occur when the interval between the nozzle N that ejects the reaction liquid and the nozzle N that ejects the ink is 25.5 millimeters or more. Therefore, as can be understood from Table ta2, in order to suppress the occurrence of clogging of the nozzle N that ejects the ink, the interval between the nozzle N that ejects the reaction liquid and the nozzle N that ejects the ink is 25.5 millimeters or more, and more preferably 33 millimeters or more.

In the first comparative example, each first nozzle row La of the head unit 252[1] ejects the reaction liquid, and each second nozzle row Lb of the same head unit 252[1] ejects orange ink. Similarly, each first nozzle row La of the head unit 252[8] ejects orange ink, and each second nozzle row Lb of the same head unit 252[8] ejects a reaction liquid. Since the interval D1 between the first nozzle row La and the second nozzle row Lb in one head chip Hn is shorter than 25.5 millimeters, each nozzle of the second nozzle row Lb of the head unit 252[1] may become clogged.

On the other hand, in the first example and the second example, as can be understood from Table ta1, the head chip Hn having the nozzle row Ln that ejects ink and the head chip Hn having the nozzle row Ln that ejects the reaction liquid are mounted on different head units 252. Therefore, since the nozzle row Ln that ejects the ink and the nozzle row Ln that ejects the reaction liquid are inevitably provided apart from each other, it is possible to suppress clogging of each nozzle of the nozzle row Ln that ejects the ink as compared with the first comparative example.

Further, regarding the drying unevenness described in Table ta1, although not illustrated, the nozzle rows Ln that eject the same type of liquid are arranged symmetrically with respect to an axis of symmetry (not illustrated). In other words, the types of liquids are arranged in the same order from the X1 direction side and the X2 direction side. Therefore, in the first example and the second example, it is possible to suppress drying unevenness when bidirectional printing is executed. The circle symbols described in the column of drying unevenness shown in Table ta1 and Table ta3 mean that the drying unevenness can be suppressed.

Further, the color development property shown in Table ta1 means the degree of color development displayed on the medium 11. As the difference between the time when the reaction liquid lands on the medium 11 and the time when the ink lands on the medium 11 becomes large, the amount of ink aggregation by the treatment liquid decreases, and thus the degree of color development decreases. For example, when the period from the landing of the reaction liquid on the medium 11 to the landing of the ink on the medium 11 is long, since the amount of the reaction liquid mixed with the ink on the surface of the medium 11 is reduced by the landed treatment liquid permeating the medium 11 or drying, the degree of color development is lowered. In the first example and the second example, the nozzle row Ln that ejects the reaction liquid and the nozzle row Ln that ejects the ink are arranged in a row along the X-axis, and the reaction liquid and the ink can be ejected in the same pass. Therefore, the degree of color development can be increased. The circle symbols described in the column of the color development property shown in Table ta1 and Table ta3 mean that the degree of color development is sufficiently high.

1-6. Summary of First Embodiment

Hereinafter, the liquid ejecting head 25 according to the first embodiment will be described assuming that the black ink corresponds to the "first liquid" and the green ink corresponds to the "second liquid". Further, in order to simplify the description, the nozzle row Ln that ejects the black ink may be referred to as a "black ink nozzle row Ln-B", the nozzle row Ln that ejects the reaction liquid may be referred to as a "reaction liquid nozzle row Ln-H", and the nozzle row Ln that ejects the green ink may be referred to as a "green ink nozzle row Ln-G". In Section 1-6, the black ink nozzle row Ln-B corresponds to the "first type nozzle row", the reaction liquid nozzle row Ln-H corresponds to the "second type nozzle row", and the green ink nozzle row Ln-G corresponds to the "third type nozzle row".

In the first example, the head units 252 having the black ink nozzle row Ln-B are the head unit 252[3] and the head unit 252[5]. Therefore, in Section 1-6, in the first example, the head unit 252[3] corresponds to the "first head unit" and the head unit 252[5] corresponds to the "second head unit". Furthermore, in the first example, the head unit 252[4] having the reaction liquid nozzle row Ln-H corresponds to the "third head unit". Furthermore, in the first example, the head units 252 having the green ink nozzle row Ln-G are the head unit 252[2] and the head unit 252[6]. Therefore, in Section 1-6, in the first example, the head unit 252[2] corresponds to the "fourth head unit" and the head unit 252[6] corresponds to the "fifth head unit".

In the second example, the head units 252 having the black ink nozzle row Ln-B are the head unit 252[4] and the head unit 252[5]. In Section 1-6, in the second example, the head unit 252[4] corresponds to the "sixth head unit". Furthermore, in Section 1-6, in the second example, the head unit 252[1] having the reaction liquid nozzle row Ln-H corresponds to the "seventh head unit", and the head unit 252[8] having the reaction liquid nozzle row Ln-H corresponds to the "eighth head unit".

The liquid ejecting head 25 according to the first example of the first embodiment ejects black ink and a reaction liquid containing an aggregating agent for aggregating the black ink. The liquid ejecting head 25 includes seven head units 252, and four head chips Hn having two nozzle rows Ln are mounted on each of the seven head units 252, the seven head units 252 are arranged side by side along the X-axis, the head chip Hn having the black ink nozzle row Ln-B and the head chip Hn having the reaction liquid nozzle row Ln-H are mounted on different head units 252 among the seven head units 252.

In the first example, since the black ink nozzle row Ln-B and the reaction liquid nozzle row Ln-H are mounted on different head units 252, the black ink nozzle row Ln-B and the reaction liquid nozzle row Ln-H are inevitably provided apart from each other. Therefore, in the liquid ejecting head 25 according to the first example, as compared with the liquid ejecting head 25 according to the first comparative example, it is possible to suppress clogging of each nozzle N of the black ink nozzle row Ln-B.

Further, in the first example, the interval D2 is wider than the interval D1.

In the liquid ejecting head 25 according to the first example, the interval between the black ink nozzle row Ln-B and the reaction liquid nozzle row Ln-H is widened as compared with the mode in which the interval D2 is shorter than the interval D1, and it is possible to suppress clogging of each nozzle N of the black ink nozzle row Ln-B.

Further, the interval D2 is 25.5 millimeters or more.

Since the interval D2 is 25.5 millimeters or more, the interval along the X-axis between the black ink nozzle row Ln-B and the reaction liquid nozzle row Ln-H is also 25.5 millimeters or more. As can be understood from Table ta2, since the interval between the black ink nozzle row Ln-B and the reaction liquid nozzle row Ln-H is 25.5 millimeters or more, it is possible to suppress clogging of each nozzle N of the black ink nozzle row Ln-B.

In the first example, the seven head units 252 include the head unit 252[3] and the head unit 252[5] to which the head chip Hn having the black ink nozzle row Ln-B is mounted and the head unit 252[4] to which the head chip Hn having the reaction liquid nozzle row Ln-H is mounted, the head unit 252[3] is arranged in the X1 direction along the X-axis with respect to the head unit 252[4], and the head unit 252[5] is arranged in the X2 direction, which is the opposite direction to the X1 direction with respect to the head unit 252[4].

In other words, in the first example, the nozzle row Ln that ejects the reaction liquid is arranged at the center of the plurality of head units 252. Therefore, in the first example, the number of head units 252 can be reduced as compared with the second example in which the nozzle rows Ln that eject the reaction liquid are arranged at both end portions of the plurality of head units 252. Specifically, the number of head units 252 in the first example is seven, and the number of head units 252 in the second example is eight. Since the number of head units 252 can be reduced, the size of the liquid ejecting head 25 can be reduced in the direction along the X-axis.

Further, in the first example, the black ink nozzle row Ln-B included in the head unit 252[3] and the black ink nozzle row Ln-B included in the head unit 252[5] are arranged line-symmetrically with respect to the axis of symmetry Ay1 orthogonal to the X-axis.

According to the first example, it is possible to suppress drying unevenness of the black ink when bidirectional printing is executed as compared with the mode in which the black ink nozzle row Ln-B is not arranged with respect to the axis of symmetry Ay1. Here, even in a mode in which the nozzle rows Ln that eject the same type of liquid are not arranged with respect to the axis of symmetry, drying unevenness can be suppressed by executing the unidirectional printing. However, in unidirectional printing, a period required for forming an image on the medium 11 is longer than in the bidirectional printing. Therefore, according to the first example, by executing the bidirectional printing, it is possible to suppress drying unevenness of the black ink when bidirectional printing is executed while shortening the period required for forming an image on the medium 11 as compared with the case of executing the unidirectional printing.

Further, in the first example, the liquid ejecting head 25 further ejects green ink which is a different type of liquid from the black ink and is aggregated by the aggregating agent, the seven head units 252 include the head unit 252[2] and the head unit 252[6] to which the head chip Hn having the green ink nozzle row Ln-G that ejects the green ink is mounted, the head unit 252[2] is arranged in the X1 direction with respect to the head unit 252[4], the head unit 252[6] is arranged in the X2 direction, which is the opposite direction to the X1 direction with respect to the head unit 252[4], and the green ink nozzle row Ln-G included in the head unit 252[2] and the green ink nozzle row Ln-G included in the head unit 252[5] are arranged line-symmetrically with respect to the axis of symmetry Ay1.

According to the first example, it is possible to suppress drying unevenness of the green ink when bidirectional printing is executed as compared with the mode in which the green ink nozzle row Ln-G is not arranged with respect to the axis of symmetry Ay1.

Further, in the second example, the eight head units 252 include the head unit 252[4] to which the head chip Hn having the black ink nozzle row Ln-B is mounted and the head unit 252[1] and the head unit 252[8] to which the head chip Hn having the reaction liquid nozzle row Ln-H is mounted, the head unit 252[1] is arranged in the X1 direction with respect to the head unit 252[4], and the head unit 252[8] is arranged in the X2 direction, which is the opposite direction to the X1 direction with respect to the head unit 252[4].

In other words, in the second example, the reaction liquid nozzle rows Ln-H are arranged at both end portions of the plurality of head units 252. In the second example as well, similarly to the first example, since the black ink nozzle row Ln-B can be arranged line-symmetrically with respect to the axis of symmetry Ay2, it is possible to suppress drying unevenness of the black ink when bidirectional printing is executed as compared with the mode in which the black ink nozzle row Ln-B is not arranged with the axis of symmetry.

2. Second Embodiment

In the head unit 252 according to the first embodiment, the plurality of head chips Hn provided are arranged to be displaced along the Y-axis, but the present disclosure is not limited thereto. A second embodiment will be described below.

2-1. Liquid Ejecting Head 25A According to Second Embodiment

Figure 9:
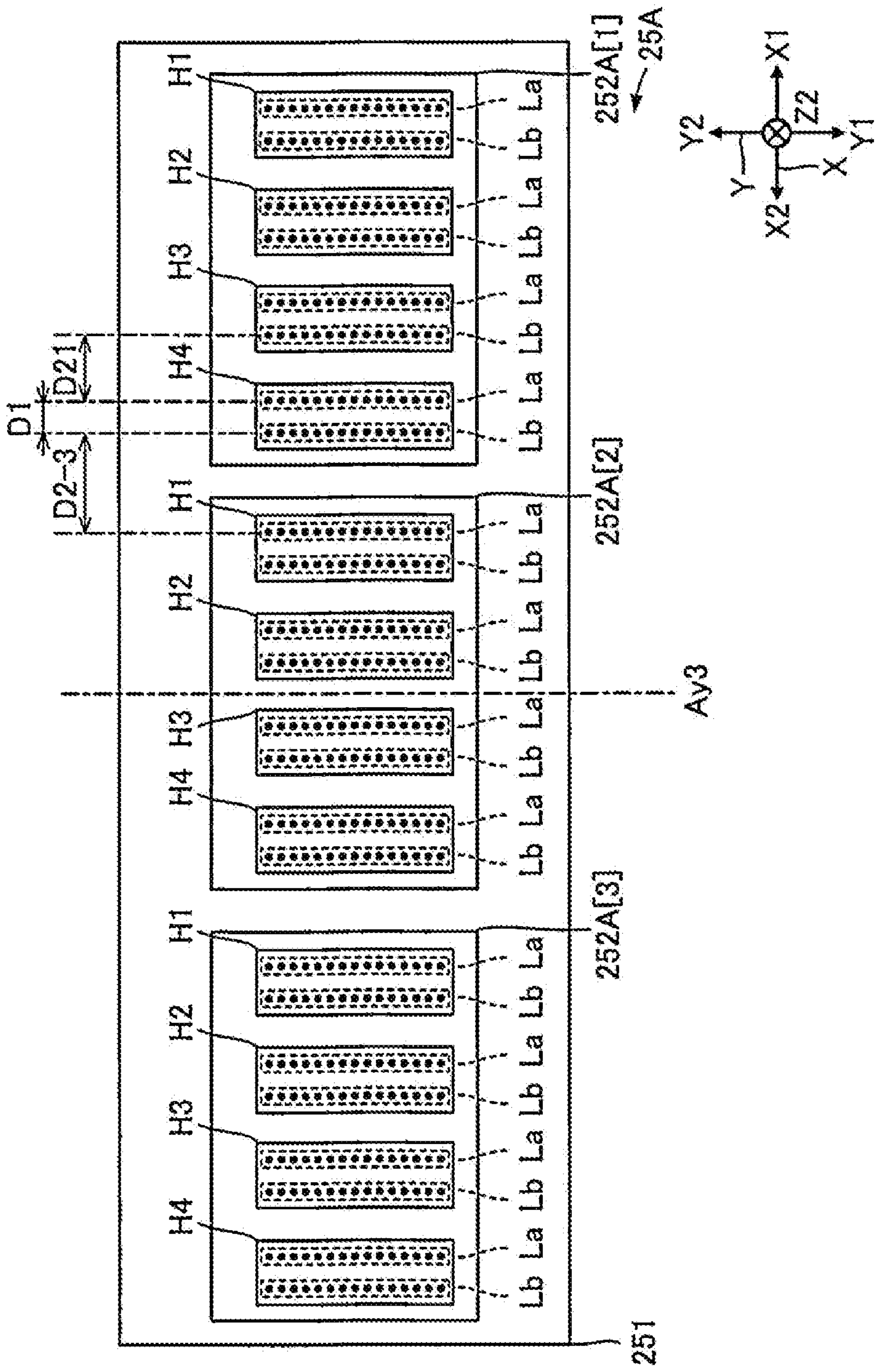
FIG. 9 is a plan view of a liquid ejecting head according to a second embodiment when viewed in the Z2 direction.

FIG. 9 is a plan view of a liquid ejecting head 25A according to a second embodiment when viewed in the Z2 direction. Here, when the liquid ejecting head 25A is viewed in the Z2 direction, the head chip Hn and the nozzle row Ln included in the liquid ejecting head 25A cannot be seen. However, in FIG. 9, in order to show the positional relationship of the nozzle rows Ln, the head chip Hn and the nozzle row Ln are shown.

The liquid ejecting head 25A is different from the liquid ejecting head 25 in that it has a plurality of head units 252A instead of the plurality of head units 252. The plurality of head chips Hn provided in the head unit 252A are arranged along the X-axis and are not displaced in the Y-axis directions Y1 and Y2. In the example illustrated in FIG. 9, the liquid ejecting head 25A has three head units 252A. In the following description, among the plurality of head units 252A arranged along the X-axis, the head unit 252A arranged closest to the X1 direction is referred to as a head unit 252A[1], and the head unit 252A located at an i-th position from the head unit 252A[1] is referred to as a head unit 252A[*i*]. In addition, the first nozzle row La of the head chip Hn of the head unit 252A[*i*] may be referred to as a first nozzle row LaA[*i*][Hn], and the second nozzle row Lb of the head chip Hn of the head unit 252A[*i*] may be referred to as a second nozzle row LbA[*i*][Hn].

As illustrated in FIG. 9, the three head units 252A are arranged side by side in a row along the X-axis.

As illustrated in FIG. 9, four head chips Hn are mounted on one head unit 252A. These four head chips Hn are arranged side by side in a row along the X-axis. As illustrated in FIG. 9, the head chip H1 is arranged closest to the X1 direction, and the head chip H2, the head chip H3, and the head chip H4 are arranged in that order toward the X2 direction.

As illustrated in FIG. 9, an interval D2-3 along the X-axis between the second nozzle row LbA[1][H4] and the first nozzle row LaA[2][H1] is wider than the interval D1 along X-axis between the first nozzle row La and the second nozzle row Lb in one head chip Hn and a distance between the nozzle rows Ln of the adjacent head chips Hn in one head unit 252A, specifically, an interval D21 along the X-axis between the second nozzle row LbA[1][H3] and the first nozzle row LaA[1][H4]. The interval D2-3 is 25.5 millimeters or more.

2-2. Example

Examples of the second embodiment will be described below, but the present disclosure is not limited to the following examples. Examples of the second embodiment will be described together with a second comparative example and a third comparative example.

FIG. 10 is a diagram showing an arrangement mode of liquids in a third example, a fourth example, a second comparative example, and a third comparative example. In Table ta3 shown in FIG. 10, the nozzle row Ln referred to as "unused" indicates that no ink is ejected. Further, "rows a and b" described in Table ta3 mean that the first nozzle row La and the second nozzle row Lb eject the same type of liquid. In addition, in the second embodiment, the liquid ejecting head 25A ejects an overcoat liquid in addition to the ink and the reaction liquid. The overcoat liquid is a liquid that does not have a coloring material and that improves the fixability of the ink ejected to the medium 11. The overcoat liquid is also aggregated by the reaction liquid. In addition to the ink, the overcoat liquid is also an example of the "first liquid" and the "second liquid".

2-2-1. Third Example

In a third example, the head unit 252A having the nozzle rows Ln that eject the reaction liquid is arranged at the center of the three head units 252A. In other words, with respect to the head units 252A having the nozzle rows Ln that eject the reaction liquid, the number of head units 252A having the nozzle rows Ln that eject the ink arranged on the X1 side is the same as the number of head units 252A having the nozzle rows Ln that eject the ink arranged on the X2 side.

In addition, in the third example, the nozzle row Ln that ejects the reaction liquid is arranged at the center of a plurality of nozzle rows Ln arranged in a row along the X-axis. Specifically, all of the head chips H1 to H4 of the three head units 252A are arranged along the X-axis. Since each head chip Hn has two nozzle rows Ln, 24 nozzle rows Ln are arranged in a row along the X-axis. In the third example, in the plurality of nozzle rows Ln arranged in a row along the X-axis, the number of the nozzle rows Ln that eject ink arranged on the X1 side of the nozzle rows Ln that eject the reaction liquid is seven and the number of the nozzle rows Ln that eject ink arranged on the X2 side thereof is seven, which are the same. Further, in the plurality of nozzle rows Ln arranged in a row along the X-axis, the number of the nozzle rows Ln that eject the overcoat liquid arranged on the X1 side of the nozzle rows Ln that eject the reaction liquid is one and the number of the nozzle rows Ln that eject the overcoat liquid arranged on the X2 side thereof is one, which are the same. Further, in the plurality of nozzle rows Ln arranged in a row along the X-axis, the number of unused nozzle rows Ln arranged on the X1 side of the nozzle rows Ln that eject the reaction liquid is one and the number of unused nozzle rows Ln arranged on the X2 side thereof is one, which are the same.

Further, in the third example as well, similarly to the first example and the second example, each of the plurality of nozzle rows Ln that eject any one of various inks, overcoat liquids, and reaction liquids is arranged line-symmetrically with the nozzle rows Ln that eject the same type of liquid with respect to an axis of symmetry Ay3 parallel to the Y-axis. In the example illustrated in FIG. 9, the axis of symmetry Ay3 passes through a position at an equal distance from both the second nozzle row LbA of the head chip H2 and the first nozzle row LaA of the head chip H3 in the head unit 252A[2] in plan view along the Z-axis.

As shown in Table ta3, in the third example, the first nozzle row LbA[1][H1] and the second nozzle row LbA[3][H4] are arranged line-symmetrically with respect to the axis of symmetry Ay3. Since the first nozzle row LaA[1][H1] ejects an overcoat liquid, the second nozzle row LbA[3][H4] also ejects an overcoat liquid. The second nozzle row LbA[1][H1] and the first nozzle row LaA[3][H4] are arranged line-symmetrically with respect to the axis of symmetry Ay3. Since the second nozzle row LbA[1][H1] ejects orange ink, the first nozzle row LaA[3][H4] also ejects orange ink. The first nozzle row LaA[1][H2] and the second nozzle row LbA[3][H3] are arranged line-symmetrically with respect to the axis of symmetry Ay3. Since the first nozzle row LaA[1][H2] ejects cyan ink, the second nozzle row LbA[3][H3] also ejects cyan ink. The second nozzle row LbA[1][H2] and the first nozzle row LaA[3][H3] are arranged line-symmetrically with respect to the axis of symmetry Ay3. Since the second nozzle row LbA[1][H2] ejects red ink, the first nozzle row LaA[3][H3] also ejects red ink. The first nozzle row LaA[1][H3] and the second nozzle row LbA[3][H2] are arranged line-symmetrically with respect to the axis of symmetry Ay3. Since the first nozzle row LaA[1][H3] ejects green ink, the second nozzle row LbA[3][H2] also ejects green ink. The second nozzle row LbA[1][H3] and the first nozzle row LaA[3][H2] are arranged line-symmetrically with respect to the axis of symmetry Ay3. Since the second nozzle row LbA[1][H3] ejects yellow ink, the first nozzle row LaA[3][H2] also ejects yellow ink. The first nozzle row LaA[1][H4] and the second nozzle row LbA[3][H1] are arranged line-symmetrically with respect to the axis of symmetry Ay3. Since the first nozzle row LaA[1][H4] ejects magenta ink, the second nozzle row LbA[3][H1] also ejects magenta ink. The second nozzle row LbA[1][H4] and the first nozzle row LaA[3][H1] are arranged line-symmetrically with respect to the axis of symmetry Ay3. Since the second nozzle row LbA[1][H4] ejects black ink, the first nozzle row LaA[3][H1] also ejects black ink.

The first nozzle row LaA[2][H1] and the second nozzle row LbA[2][H4], and the second nozzle row LbA[2][H1] and the first nozzle row LaA[2][H4] are arranged line-symmetrically with respect to the axis of symmetry Ay3. Since the first nozzle row LaA[2][H1] and the second nozzle row LbA[2][H1] do not eject the liquid, the second nozzle row LbA[2][H4] and the first nozzle row LaA[2][H4] also do not eject the liquid. The first nozzle row LaA[2][H2] and the second nozzle row LbA[2][H3], and the second nozzle row LbA[2][H2] and the first nozzle row LaA[2][H3] are arranged line-symmetrically with respect to the axis of symmetry Ay3. Since the first nozzle row LaA[2][H2] and the second nozzle row LbA[2][H2] eject the reaction liquid, the second nozzle row LbA[2][H2] and the first nozzle row LaA[2][H3] also eject the reaction liquid.

With such a configuration, in the plurality of head units 252A, nozzle rows Ln arranged in a row along the X-axis are arranged in the order of a nozzle row Ln that ejects a reaction liquid, a nozzle row Ln that ejects a reaction liquid, a nozzle row Ln that does not eject a liquid, a nozzle row Ln that does not eject a liquid, a nozzle row Ln that ejects black ink, a nozzle row Ln that ejects magenta ink, a nozzle row Ln that ejects yellow ink, a nozzle row Ln that ejects green ink, a nozzle row Ln that ejects red ink, a nozzle row Ln that ejects cyan ink, a nozzle row Ln that ejects orange ink, and a nozzle row Ln that ejects an overcoat liquid in both the order from the axis of symmetry Ay3 to the X1 side and the order from the axis of symmetry Ay3 to the X2 side.

Accordingly, it is possible to suppress printing unevenness due to bidirectional printing, similarly to the first example.

As can be understood from FIG. 9 and Table ta3, in the third example, the head unit 252A including the head chip Hn having the nozzle row Ln that ejects the reaction liquid is only the head unit 252A[2]. Further, the head unit 252A[2] does not have the nozzle row Ln that ejects the ink or the overcoat liquid. Further, the head units 252A including the head chip Hn having the nozzle row Ln that ejects the ink or overcoat liquid are the head units 252[1] and [3], and the head units 252[1] and [3] do not have the nozzle rows Ln that eject the reaction liquid. Therefore, the head chip Hn having the nozzle row Ln that ejects the ink or overcoat liquid and the head chip Hn having the nozzle row Ln that ejects the reaction liquid are mounted on different head units 252A.

2-2-2. Fourth Example

In a fourth example as well, similarly to the third example, the head unit 252A having the nozzle rows Ln that eject the reaction liquid is arranged at the center of the three head units 252A. The fourth example is different from the third example in that the first nozzle row LaA[2][H1], the second nozzle row LbA[2][H1], the first nozzle row LaA[2][H4], and the second nozzle row LbA[2][H4] eject the reaction liquid, but is the same as the third example in other respects.

2-2-3. Second Comparative Example

In a second comparative example, nozzle rows Ln that eject the reaction liquid are arranged at both end portions of the three head units 252. The second comparative example is different from the third example in that the first nozzle row LaA[1][H1] and the second nozzle row LbA[3][H4] eject the reaction liquid, the second nozzle row LbA[1][H1] and the first nozzle row LaA[3][H4] eject the overcoat liquid, and the liquid is not ejected from all the nozzle rows Ln of the head unit 252A[2], but is the same as the third example in other respects.

2-2-4. Third Comparative Example

In a third comparative example, similarly to the second comparative example, nozzle rows Ln that eject the reaction liquid are arranged at both end portions of the three head units 252. The third comparative example is different from the second comparative example in that the second nozzle row LbA[1][H1] and the first nozzle row LaA[3][H4] eject the reaction liquid, but is the same as the second comparative example in other respects.

2-2-5. Effects of Third Example and Fourth Example

The effects of the third example and the fourth example will be described with reference to Table ta3. As shown in Table ta3, experiments conducted by the inventors have shown that clogging of the nozzle N that ejects ink does not occur in the third example and the fourth example, and clogging of the nozzle N that ejects ink occurs in the second comparative example and the third comparative example. In the third example and the fourth example, it is assumed that, since the head chip Hn having the nozzle row Ln that ejects the ink or the overcoat liquid and the head chip Hn having the nozzle row Ln that ejects the reaction liquid are mounted on different head units 252A, the mist of the reaction liquid did not reach the nozzle N that ejects the ink and the nozzle N that ejects the overcoat liquid. On the other hand, in the second comparative example, it is assumed that the head unit 252A[1] and the head unit 252A[3] have the nozzle row Ln that ejects the reaction liquid together with the nozzle row Ln that ejects the overcoat liquid and the ink, and the mist of the reaction liquid reached the nozzle N that eject the overcoat liquid and the nozzle N was clogged. In the third comparative example, similarly to the second comparative example, it is assumed that the head unit 252A[1] and the head unit 252A[3] have the nozzle row Ln that ejects the ink and the nozzle row Ln that ejects the reaction liquid, and the mist of the reaction liquid reached the nozzle N that eject the ink and the nozzle N was clogged.

As shown in Table ta3, in the third example and the fourth example, the nozzle rows Ln that eject the same type of liquid are arranged line-symmetrically with respect to the axis of symmetry Ay3. Therefore, as shown in Table ta3, in the third example and the fourth example, it is possible to suppress drying unevenness when bidirectional printing is executed.

With respect to the color development property shown in Table ta3, in the third example and the fourth example, the reaction liquid and the ink can be ejected within the same pass. Therefore, as shown in Table ta3, in the third example and the fourth example, the degree of color development can be increased.

2-3. Summary of Second Embodiment

Hereinafter, the liquid ejecting head 25A according to the second embodiment will be described assuming that the overcoat liquid corresponds to the "first liquid" and the black ink corresponds to the "second liquid". Further, for simplification of the description, the nozzle row that ejects the overcoat liquid may be referred to as an "overcoat liquid nozzle row Ln-O". In Section 2-3, the overcoat liquid nozzle row Ln-O corresponds to the "first type nozzle row", the reaction liquid nozzle row Ln-H corresponds to the "second type nozzle row", and the black ink nozzle row Ln-B corresponds to the "third type nozzle row".

In the third example, the head units 252 having the overcoat liquid nozzle row Ln-O are the head unit 252A[1] and the head unit 252A[3]. Therefore, in Section 2-3, in the third example, the head unit 252A[1] is an example of the "first head unit" and the head unit 252A[3] corresponds to the "second head unit". Furthermore, in the third example, the head units 252A having the black ink nozzle row Ln-B are the head unit 252A[1] and the head unit 252A[3]. Therefore, in Section 2-3, in the third example, the head unit 252A[1] also corresponds to the "fourth head unit" in addition to the "first head unit" and the head unit 252A[3] also corresponds to the "fifth head unit" in addition to the "second head unit". Thus, the "first head unit" and the "fourth head unit" may be the same head unit 252A, or the "second head unit" and the "fifth head unit" may be the same head unit 252A.

The liquid ejecting head 25A according to the third example of the second embodiment ejects an overcoat liquid and a reaction liquid containing an aggregating agent for aggregating the overcoat liquid. The liquid ejecting head 25 includes three head units 252A, and four head chips Hn having two nozzle rows Ln are mounted on each of the three head units 252A, the three head units 252A are arranged side by side along the X-axis, the head chip Hn having the overcoat liquid nozzle row Ln-O and the head chip Hn having the reaction liquid nozzle row Ln-H are mounted on different head units 252A among the three head units 252A.

In the third example, the overcoat liquid nozzle row Ln-O and the reaction liquid nozzle row Ln-H are mounted on different head units 252. Therefore, in the liquid ejecting head 25A according to the third example, it is possible to suppress clogging of each nozzle N of the overcoat liquid nozzle row Ln-O as compared with the liquid ejecting head 25A according to the second comparative example.

Also, as illustrated in FIG. 9, the interval D2-3 is wider than the interval D2 and the interval D21. The interval D2-3 is 25.5 millimeters or more.

In addition, the three head units 252A include the head unit 252A[1] and the head unit 252A[3] to which the head chip Hn having the overcoat liquid nozzle row Ln-O is mounted and the head unit 252A[3] to which the head chip Hn having the reaction liquid nozzle row Ln-H is mounted, the head unit 252A[1] is arranged in the X1 direction along the X-axis with respect to the head unit 252A[2], and the head unit 252A[3] is arranged in the X2 direction, which is the opposite direction to the X1 direction with respect to the head unit 252A[2].

The overcoat liquid nozzle row Ln-O included in the head unit 252A[1] and the overcoat liquid nozzle row Ln-O included in the head unit 252A[3] are arranged line-symmetrically with respect to the axis of symmetry Ay3 orthogonal to the X-axis.

The liquid ejecting head 25A further ejects black ink which is a different type of liquid from the overcoat liquid and is aggregated by the aggregating agent, and the three head units 252A include the head unit 252A[1] and the head unit 252A[3] to which the head chips Hn having the black ink nozzle rows Ln-B that eject black ink are mounted.

3. Modification Example

The above-described liquid ejecting apparatus can be employed in various devices such as a facsimile machine and a copier, in addition to a device dedicated to printing. However, the application of use of the liquid ejecting apparatus of the present disclosure is not limited to printing. For example, a liquid ejecting apparatus that ejects a solution of a coloring material is used as a manufacturing device forming a color filter of a liquid crystal display device. In addition, a liquid ejecting apparatus that ejects a solution of a conductive material is used as a manufacturing device for forming wiring and electrodes of a wiring substrate.

4. Supplementary Note

From the embodiments illustrated above, for example, the following configuration can be grasped.

A liquid ejecting head according to a first aspect, which is a preferred aspect, is a liquid ejecting head that ejects a first liquid and a reaction liquid containing an aggregating agent for aggregating the first liquid, the liquid ejecting head including a plurality of head units, in which a plurality of head chips having one or more nozzle rows are mounted on each of the plurality of head units, the plurality of head units are arranged side by side along a first axis, and a head chip having a first type nozzle row that ejects the first liquid and a head chip having a second type nozzle row that ejects the reaction liquid are mounted on different head units among the plurality of head units.

According to the first aspect, since the first type nozzle row and the second type nozzle row are mounted on different head units, the first type nozzle row and the second type nozzle row are inevitably provided apart from each other. Therefore, in the liquid ejecting head according to the first aspect, it is possible to suppress clogging of each nozzle of the first type nozzle row as compared with the mode in which the first type nozzle row and the second type nozzle row are mounted on the same head unit.

In a second aspect, which is a specific example of the first aspect, each of the plurality of head units has a plurality of nozzle rows, and in two head units adjacent to each other along the first axis among the plurality of head units, a second interval along the first axis between a nozzle row among a plurality of nozzle rows included in one head unit, which is closest to the other head unit, and a nozzle row among a plurality of nozzle rows included in the other head unit, which is closest to the one head unit, is wider than a first interval along the first axis between adjacent nozzle rows among the plurality of nozzle rows included in the one head unit.

According to the second aspect, the interval between the first type nozzle row and the second type nozzle row is widened as compared with the mode in which the second interval is shorter than the first interval, and it is possible to suppress clogging of each nozzle of the first type nozzle row.

In a third aspect, which is a specific example of the second aspect, the second interval is 25.5 millimeters or more.

Since the second interval is 25.5 millimeters or more, the interval along the first axis between the first type nozzle row and the second type nozzle row is also 25.5 millimeters or more. Therefore, according to the third aspect, since the interval between the first type nozzle row and the second type nozzle row is 25.5 millimeters or more, it is possible to suppress clogging of each nozzle of the first type nozzle row.

In a fourth aspect, which is a specific example of any one of the first to third aspects, the plurality of head units include a first head unit and a second head unit to which a head chip having the first type nozzle row is mounted and a third head unit to which a head chip having the second type nozzle row is mounted, the first head unit is arranged in a first direction along the first axis with respect to the third head unit, and the second head unit is arranged in a direction opposite to the first direction with respect to the third head unit.

According to the fourth aspect, it is possible to reduce the number of head units having the second type nozzle row as compared with the mode in which the head unit in which the head chips having the second type nozzle row is mounted are arranged at both end portions of the plurality of head units.

In a fifth aspect, which is a specific example of the fourth aspect, the first type nozzle row included in the first head unit and the first type nozzle row included in the second head unit are arranged line-symmetrically with respect to an axis of symmetry orthogonal to the first axis.

According to the fifth aspect, it is possible to suppress drying unevenness of the first liquid when bidirectional printing is executed as compared with the mode in which the first type nozzle row is not arranged with respect to the axis of symmetry.

In a sixth aspect, which is a specific example of the fifth aspect, the liquid ejecting head further ejects a second liquid which is a different type of liquid from the first liquid and is aggregated by the aggregating agent, the plurality of head units include a fourth head unit and a fifth head unit to which a head chip having a third type nozzle row that ejects the second liquid is mounted, the fourth head unit is arranged in the first direction with respect to the third head unit, the fifth head unit is arranged in the direction opposite to the first direction with respect to the third head unit, and the third type nozzle row included in the fourth head unit and the third type nozzle row included in the fifth head unit are arranged line-symmetrically with respect to the axis of symmetry.

According to the sixth aspect, it is possible to suppress drying unevenness of the second liquid when bidirectional printing is executed as compared with the mode in which the third type nozzle row is not arranged with respect to the axis of symmetry.

In a seventh aspect, which is a specific example of any one of the first to third aspects, the plurality of head units include a sixth head unit to which a head chip having the first type nozzle row is mounted and a seventh head unit and an eighth head unit to which a head chip having the second type nozzle row is mounted, the seventh head unit is arranged in a first direction along the first axis with respect to the sixth head unit, and the eighth head unit is arranged in a direction opposite to the first direction with respect to the sixth head unit.

According to the seventh aspect, since the first type nozzle row can be arranged line-symmetrically with respect to the axis of symmetry, it is possible to suppress drying unevenness of the first liquid when bidirectional printing is executed as compared with the mode in which the first type nozzle row is not arranged with the axis of symmetry.

A liquid ejecting head according to an eighth aspect, which is a preferred aspect, is a liquid ejecting head that ejects a first liquid and a reaction liquid containing an aggregating agent for aggregating the first liquid, the liquid ejecting head including a plurality of nozzle rows, in which the plurality of nozzle rows are arranged side by side along a first axis, the plurality of nozzle rows include a first type nozzle row that ejects the first liquid and a second type nozzle row that ejects the reaction liquid, and an interval along the first axis between the first type nozzle row and the second type nozzle row is 25.5 millimeters or more.

In the eighth aspect, since the interval along the first axis between the first type nozzle row and the second type nozzle row is 25.5 millimeters or more, it is possible to separate an interval between the first type nozzle row and the second type nozzle row to such an extent that the mist of the reaction liquid does not reach the nozzle N that ejects the first liquid. Therefore, in the liquid ejecting head according to the eighth aspect, it is possible to suppress clogging of each nozzle of the first type nozzle row as compared with the mode in which the interval along the first axis between the first type nozzle row and the second type nozzle row is 16 millimeters.

What is claimed is:

1. A liquid ejecting head that is configured to eject a first liquid and a reaction liquid containing an aggregating agent for aggregating the first liquid, the liquid ejecting head comprising:
a plurality of head units, wherein
a plurality of head chips having one or more nozzle rows are mounted on each of the plurality of head units,
the plurality of head units are arranged side by side along a first axis,
a head chip having a first type nozzle row that is configured to eject the first liquid and a head chip having a second type nozzle row that is configured to eject the reaction liquid are mounted on different head units among the plurality of head units,
each of the plurality of head units has a plurality of nozzle rows, and
in two head units adjacent to each other along the first axis among the plurality of head units, a second interval along the first axis between a nozzle row among a plurality of nozzle rows included in one head unit, which is closest to the other head unit, and a nozzle row among a plurality of nozzle rows included in the other head unit, which is closest to the one head unit, is wider than a first interval along the first axis between adjacent nozzle rows among the plurality of nozzle rows included in the one head unit.

2. The liquid ejecting head according to claim 1, wherein the second interval is 25.5 millimeters or more.

3. A liquid ejecting head that is configured to elect a first liquid and a reaction liquid containing an aggregating agent for aggregating the first liquid, the liquid electing head comprising:
a plurality of head units, wherein
a plurality of head chips having one or more nozzle rows are mounted on each of the plurality of head units,
the plurality of head units are arranged side by side along a first axis,
a head chip having a first type nozzle row that is configured to eject the first liquid and a head chip having a second type nozzle row that is configured to eject the reaction liquid are mounted on different head units among the plurality of head units,
the plurality of head units include a first head unit to which a head chip having the first type nozzle row is mounted, a second head unit to which a head chip having the first type nozzle row is mounted, and a third head unit to which a head chip having the second type nozzle row is mounted,
the first head unit is arranged in a first direction along the first axis with respect to the third head unit, and
the second head unit is arranged in a direction opposite to the first direction with respect to the third head unit.

4. The liquid ejecting head according to claim 3, wherein the first type nozzle row included in the first head unit and the first type nozzle row included in the second head unit are arranged line-symmetrically with respect to an axis of symmetry orthogonal to the first axis.

5. The liquid ejecting head according to claim 4, wherein
the liquid ejecting head further ejects a second liquid which is a different type of liquid from the first liquid and is aggregated by the aggregating agent,
the plurality of head units include a fourth head unit to which a head chip having a third type nozzle row that is configured to eject the second liquid is mounted and a fifth head unit to which a head chip having a third type nozzle row that is configured to eject the second liquid is mounted,
the fourth head unit is arranged in the first direction with respect to the third head unit,
the fifth head unit is arranged in the direction opposite to the first direction with respect to the third head unit, and
the third type nozzle row included in the fourth head unit and the third type nozzle row included in the fifth head unit are arranged line-symmetrically with respect to the axis of symmetry.

6. A liquid electing head that is configured to elect a first liquid and a reaction liquid containing an aggregating agent for aggregating the first liquid, the liquid ejecting head comprising:
a plurality of head units, wherein
a plurality of head chips having one or more nozzle rows are mounted on each of the plurality of head units,
the plurality of head unit side by side along a first axis,
a head chip having a first type nozzle row that is configured to eject the first liquid and a head chip having a second type nozzle row that is configured to elect the reaction liquid are mounted on different head units among the plurality of head units,
the plurality of head units include a sixth head unit to which a head chip having the first type nozzle row is mounted and a seventh head unit to which a head chip having the second type nozzle row is mounted and an eighth head unit to which a head chip having the second type nozzle row is mounted,
the seventh head unit is arranged in a first direction along the first axis with respect to the sixth head unit, and
the eighth head unit is arranged in a direction opposite to the first direction with respect to the sixth head unit.

7. A liquid ejecting head that is configured to eject a first liquid and a reaction liquid containing an aggregating agent for aggregating the first liquid, the liquid ejecting head comprising:
a plurality of nozzle rows, wherein
the plurality of nozzle rows are arranged side by side along a first axis,
the plurality of nozzle rows include a first type nozzle row that is configured to eject the first liquid and a second type nozzle row that is configured to eject the reaction liquid, and
an interval along the first axis between the first type nozzle row and the second type nozzle row is 25.5 millimeters or more.

* * * * *